(12) United States Patent
Wang

(10) Patent No.: US 12,042,905 B2
(45) Date of Patent: Jul. 23, 2024

(54) BULLET-CARRIED RUST REMOVAL MECHANISM AND RUST REMOVAL DEVICE

(71) Applicant: LiDuo JQR Group Co. Ltd, Guangzhou (CN)

(72) Inventor: Dong Wang, Guangzhou (CN)

(73) Assignee: LiDuo JQR Group Co. Ltd, Guangzhou (CN)

( * ) Notice: Subject to any disclaimer, the term of this patent is extended or adjusted under 35 U.S.C. 154(b) by 485 days.

(21) Appl. No.: 17/479,040

(22) Filed: Sep. 20, 2021

(65) Prior Publication Data

US 2022/0001510 A1    Jan. 6, 2022

Related U.S. Application Data

(63) Continuation of application No. PCT/CN2020/079752, filed on Mar. 17, 2020.

(30) Foreign Application Priority Data

| Mar. 27, 2019 | (CN) | 201910239650.4 |
| Jul. 18, 2019 | (CN) | 201910650545.X |
| Jan. 9, 2020 | (CN) | 202010022454.4 |
| Feb. 27, 2020 | (CN) | 202020223242.8 |
| Feb. 28, 2020 | (CN) | 202010131297.0 |

(51) Int. Cl.
| B08B 7/02 | (2006.01) |
| B24C 1/00 | (2006.01) |
| B25D 9/02 | (2006.01) |
| B25D 9/08 | (2006.01) |
| B25D 17/02 | (2006.01) |

(52) U.S. Cl.
CPC ............ *B24C 1/006* (2013.01); *B08B 7/02* (2013.01); *B25D 9/02* (2013.01); *B25D 9/08* (2013.01); *B25D 17/02* (2013.01); *Y10T 29/4583* (2015.01)

(58) Field of Classification Search
CPC ........ Y10T 29/4583; B25D 9/02; B25D 9/08; B25D 17/02; B08B 7/02
See application file for complete search history.

(56) References Cited

U.S. PATENT DOCUMENTS

| 1,585,740 A * | 5/1926 | Saulia | B25D 9/08 173/101 |
| 3,150,888 A * | 9/1964 | Parker | B08B 7/022 29/81.14 |
| 3,349,461 A * | 10/1967 | Niedzwiecki | B25D 17/02 29/81.14 |
| 3,589,352 A * | 6/1971 | Carlsson | B23Q 1/0036 125/6 |
| 5,010,632 A * | 4/1991 | Gardner | B08B 7/022 29/81.14 |

\* cited by examiner

*Primary Examiner* — Jermie E Cozart

(57) ABSTRACT

A bullet-carried rust removal mechanism and a rust removal device are provided. The bullet-carried rust removal mechanism includes bullets, the bullets can reciprocate linearly under the driving of an external driving mechanism to thereby repeatedly knock a surface to be derusted, and an end of each of the bullets away from the driving mechanism is a knocking portion for derusting conveniently. The bullet-carried rust removal mechanism has a relatively small volume and a position to be derusted can be accurately positioned during derusting.

18 Claims, 23 Drawing Sheets

BULLET-CARRIED RUST REMOVAL MECHANISM AND RUST REMOVAL DEVICE

TECHNICAL FIELD

The disclosure relates to the field of rust removal equipment, and more particularly to a bullet-carried rust removal mechanism and a rust removal device.

BACKGROUND

At present, rust removal methods in the market can be mainly divided into a shot blasting removal, an abrasive blasting removal, and a pickling free drawing and rust removal.

The shot blasting removal mainly uses a high-speed operation of mechanical equipment to throw out steel shots of a certain size by a centrifugal force of a blasting head mechanism, and the thrown steel shots collide violently with an object to be derusted to thereby remove the rust on the object to be derusted. In particular, a shot blasting removal device is mainly composed of a shot blasting apparatus, a wear-resistant rubber ring belt, an auger (also referred to as screw conveyor), an elevator, a separator, a feeding conveyor, a dust remover and an electrical appliance. The abrasive blasting removal is a rust removal method that uses high-pressure air to bring out quartz sands and eject them onto surfaces of components. A complete suction-type dry sand blasting device is generally composed of six systems, i.e., a structure system, a medium power system, a pipeline system, a dust removal system, a control system and an auxiliary system. The pickling free drawing and rust removal is mainly aimed at the rust removal of wire rod. A pickling free shelling and rust removal device is mainly composed of a gearbox five-wheel shelling mechanism, an adjustable cross parabolic steel wire brush wheel, a fully enclosed rust removal chamber, a forced lubrication apparatus, a wire drawing die base and an electrical control system. It can be seen that regardless of the shot blasting removal, the sand blasting removal or a pickling free drawing and rust removal, the rust removal process of which requires a combination of a variety of equipment to form a complete rust removal production line, thus a volume of the device is huge, and a position to be derusted cannot be accurately positioned during derusting.

SUMMARY OF THE DISCLOSURE

In view of the above drawbacks, a bullet-carried rust removal mechanism and a rust removal device are provided by the disclosure, which has a relatively small volume and a position to be derusted can be accurately positioned during derusting.

Specifically, a bullet-carried rust removal mechanism provided by the disclosure includes bullets and a driving mechanism. The bullets are configured (i.e., structured and arranged) for reciprocating linearly under the driving of the driving mechanism to thereby repeatedly knock/strike a surface to be derusted. An end of each of the bullets away from the driving mechanism is a knocking portion for derusting.

Preferably, the bullet-carried rust removal mechanism may further include bullet-carried rust removal mechanism bases. Each of the bullet-carried rust removal mechanism bases is provided with a gas receiving cavity and the driving mechanism is communicated with the gas receiving cavity. The driving mechanism is provided with a gas distribution mechanism. Each of the bullets is movably embedded in the gas receiving cavity, a side wall of each of the bullets abuts against an inner wall of the gas receiving cavity to isolate gas pressure in the gas receiving cavity from atmosphere. The gas distribution mechanism is configured to introduce a gas into the gas receiving cavity to thereby drive the bullet to knock the surface to be derusted, and the bullet returned back after knocking the surface to be derusted.

Preferably, the bullet-carried rust removal mechanism may further include a buffer cavity. The gas receiving cavity includes a guide hole and a piston cavity, and the guide hole and the piston cavity are connected and communicated with each other. The bullet is movably embedded in the guide hole, and the side wall of the bullet abuts against an inner wall of the guide hole so that the piston cavity is not communicated with atmospheric pressure. The piston cavity is provided with a pressurization stage, and the guide hole is provided with a pressure relief stage. A gas passage is provided between the buffer cavity and the pressurization stage so that the buffer cavity and the pressurization stage are communicated with each other. The bullet may include an inner cavity. A side portion of the bullet is provided with a gas ventilation hole communicating with the inner cavity. A gas outlet of the gas distribution mechanism is communicated with the buffer cavity. A position of the gas ventilation hole is aligned with the pressurization stage when the bullet is in a normal state or retreats to an initial position. When the gas distribution mechanism pressurizes the buffer cavity, gas enters and fills the inner cavity through the gas ventilation hole, and the bullet is driven by gas pressure in the piston cavity to move forward along the guide hole. Gas pressure in the inner cavity leaks to the pressure relief stage and the bullet returns back to the initial position after knocking the surface to be derusted when the bullet moves until the gas ventilation hole is aligned with the pressure relief stage.

Preferably, the bullet-carried rust removal mechanism may further include a first limit part and a second limit part. The first limit part is arranged on the bullet, and the second limit part is arranged on a side wall of the gas receiving cavity. The first limit part and the second limit part are configured to abut against each other when the bullet moves toward an opening of the gas receiving cavity up to an extreme position to thereby prevent the bullet from escaping from the gas receiving cavity.

Preferably, the first limit part is a ring-shaped bulge on the bullet. An inner diameter of the piston cavity is larger than an inner diameter of the guide hole. The guide hole and the piston cavity are connected by a connecting part, and the connection part is the second limit part.

Preferably, the bullet includes an inner cavity. The side wall of the bullet is provided with a first gas ventilation hole and a second gas ventilation hole. A side wall of the gas receiving cavity is provided with a pressurization stage and a pressure relief stage. The first gas ventilation hole is operatively aligned with the pressure relief stage, and the second gas ventilation hole is operatively aligned with the pressurization stage.

Preferably, the bullet-carried rust removal mechanism may further include a buffer cavity. A gas outlet of the gas distribution mechanism is communicated with the buffer cavity. The second gas ventilation hole is aligned with the pressurization stage when the gas distribution mechanism pressurizes the buffer cavity, and thereby gas enters and fills the inner cavity through the second gas ventilation hole and the bullet is driven by gas pressure in the piston cavity to move forward along the guide hole. The gas pressure in the inner cavity leaks to the pressure relief stage when the bullet moves until the first gas ventilation hole is aligned with the pressure relief stage, and thereby the bullet is positionally restored.

Preferably, a first end of the bullet is provided with a first limit part, and a diameter of the first limit part is larger than a diameter of the bullet. A side wall of the piston cavity is provided with a second limit part matched with the first limit part. A diameter of the second limit part is matched with the diameter of the bullet. The pressurization stage is located on the second limit part and an opening of the pressurization stage facing toward the first limit part.

Preferably, the bullet-carried rust removal mechanism base includes a first body and a second body, and the first body is connected with the second body. A pressurization stage is formed on the first body, a pressure relief stage is formed on the second body. A gas receiving cavity is formed between the first body and the second body, and a bullet outlet allowing the knocking portion of the bullet to pass through is formed on the second body. The gas receiving cavity and the pressure relief stage are communicated while the gas receiving cavity and the pressurization stage are not communicated when the bullet is in an extended state, and the gas receiving cavity and the pressure relief stage are not communicated while the gas receiving cavity and the pressurization stage are communicated when the bullet is in a retracted state.

Preferably, the bullet-carried rust removal mechanism base may include a first body and a second body, and the first body and the second body are connected. A piston cavity and a buffer cavity are formed inside the first body. The second body is provided with a guide hole. A pressure relief stage is formed on a side wall of the guide hole, and the knocking portion of the bullet is capable of passing through the guide hole and protruding outside the guide hole.

Preferably, the first body further is provided with a gas passage, and a pressurization stage is formed on a side wall of the piston cavity. The pressurization stage is communicated with the buffer cavity through the gas passage. The bullet is provided with an inner cavity and at least one gas ventilation hole. The at least one gas ventilation hole is operatively to be communicated with the pressure relief stage to thereby make pressure in the gas receiving cavity be leakage.

Preferably, the at least one gas ventilation hole may include a first gas ventilation hole and a second gas ventilation hole, and the first gas ventilation hole and the second gas ventilation hole are both communicated with the inner cavity. The second gas ventilation hole is communicated with the pressurization stage while the first gas ventilation hole is closed by a side wall of the guide hole when the bullet is in a retracted state, and the first gas ventilation hole is communicated with the pressure relief stage while the second gas ventilation hole is closed by a side wall of the piston cavity when the bullet is in an extended state.

Preferably, a specific gravity of material of the second body is lower than a specific gravity of material of the first body.

Preferably, the first body includes a piston cylinder, an inner cover and an outer cover. The piston cavity is located in the piston cylinder, the bullet passes through the piston cavity, and an end of the bullet is snapped in the piston cavity, and the outer cover is fixed on the piston cylinder. The inner cover is located between the piston cavity and the buffer cavity, the bullet and the inner cover seal the piston cavity, and the inner cover and the outer cover seal the buffer cavity. When the bullet is extended, the inner cover is pressed toward the piston cavity by gas pressure, and when the bullet is restored, the bullet presses the inner cover toward the buffer cavity.

Preferably, a diameter of the buffer cavity is larger than a diameter of the piston cavity, and the buffer cavity and the piston cavity are coaxial. A first end of the inner cover is matched with the piston cavity, and a second end of the inner cover is matched with the buffer cavity. A second end face of the inner cover is provided with a gas tighten groove, and the gas tighten groove is communicated with the buffer cavity.

Preferably, the first body is made of a metal material, and the second body is made of a plastic material.

Preferably, the second bodies of at least some of the bullet-carried rust removal mechanisms are connected to form a one-piece structure.

The disclosure also provides a rust removal device, which includes a mounting frame and multiple bullet-carried rust removal mechanisms of any one of the above-mentioned, and the multiple bullet-carried rust removal mechanisms are installed on the mounting frame.

Preferably, the mounting frame may include a suspension beam, at least two support columns, a connecting column and a pull rod. At least two support columns are fixedly connected with the suspension beam and extend upward relative to the suspension beam. The connecting column is connected with the suspension beam and located between the two support columns. A first end of the pull rod is connected with the support column, a second end is connected with the connecting column, and the first end of the pull rod is higher than the second end.

Preferably, the mounting frame may include a suspension beam, two support columns, two connecting columns, two pull rods and a connecting rod. The two support columns are respectively fixed at both ends of the suspension beam. The two connecting columns are fixed on the suspension beam and located between the two support columns, and the two connecting columns are arranged at intervals. The two ends of the two pull rods are respectively connected with the corresponding connecting column and the support column. Two ends of the connecting rod are respectively connected with the two connecting columns.

Preferably, the rust removal device may further include a first rust removal array and a second rust removal array. A feeding channel/passage is provided between the first rust removal array and the second rust removal array. Each of the first rust removal array and each of the second rust removal array may include the multiple bullet-carried rust removal mechanisms arranged side by side. An orientation of the bullets of the first rust removal array and an orientation of the bullets of the second rust removal array are opposite. The first rust removal array and the second rust removal array are arranged in face-to-face manner or in a staggered manner in a feeding direction of the rust removal device.

Preferably, the rust removal device may include a front rust removal array and a rear rust removal array. The front rust removal array and the rear rust removal array are spaced from each other along a feeding direction of the rust removal device. The rear rust removal array is arranged on a feeding-out side of the front rust removal array, and a rust detection device is arranged between the front rust removal array and the rear rust removal array.

Preferably, the feeding-out side of the rear rust removal array is provided with another rust detection device.

Preferably, at least some of the multiple bullet-carried rust removal mechanisms are distributed in multiple rows and multiple columns, and centers of the knocking portions of at least some of the bullet-carried rust removal mechanisms in different rows are staggered in a direction perpendicular to a feeding direction of the rust removal device.

Preferably, in a knocking surface of the rust removal device, centers of at least some of the knocking portions of the bullet-carried rust removal mechanism are distributed in a parallel quadrilateral point array, and a connecting line of the centers of the knocking portions in the same column of the bullet-carried rust removal mechanism is oblique relative to a feeding direction of the rust removal device.

Preferably, the mounting frame may include a rail robot, the bullet-carried rust removal mechanisms are installed on the rail robot, and the rail robot is configured to drive the bullet-carried rust removal mechanism to move.

Preferably, the rail robot may include a first driving mechanism and a rail assembly for the bullet-carried rust removal mechanism to move, and the rail robot operatively moves under a driving of the first driving mechanism.

Preferably, the rail assembly comprises a first rail and second rails, and the second rails are connected with the first rail.

Preferably, the rail assembly may further include a third driving mechanism and a rotating joint assembly, and an end of the second rail and an end of the first rail are rotatably connected by the rotating joint assembly. In a first state, the second rail swings relative to the first rail under the driving of the third driving mechanism. In a second state, the second rail is fixedly connected to the first tail.

Preferably, the rust removal device may further include an anchoring mechanism, and the anchoring mechanism is configured to anchor the rail robot when the rail robot stops moving.

Preferably, the rail assembly may include flexible tension wires and a sliding table. The sliding table may include a pulley and another driving mechanism, and the flexible tension wires are wound around the pulley. When the another driving mechanism drives the pulley to rotate, the pulley operatively moves along the flexible tension wires to drive the sliding table to slide. When the pulley stops rotating, the pulley is stationary relative to the flexible tension wires.

Preferably, the rust removal device may further include a first rail. The flexible tension wires extend along a lengthwise of the first rail, and the sliding table is connected to the first rail and movable along the first rail.

Preferably, the rust removal device may further include second rails. The flexible tension wire includes a locking-releasing stage, and the second rails are configured for a movement of the bullet-carried rust removal mechanism. The second rail may include a pausing stage, and the pausing stage is arranged on a side of the locking-releasing stage, so that the bullet-carried rust removal mechanism being stationary at the pausing stage is capable of being locked or unlocked with the sliding table staying at the locking-releasing stage.

Preferably, the rust removal device may further include a first rail and second rails, the first rail and the second rails are rotatably connected. The first rail and each of the second rail have a lockable positioning mechanism arranged therebetween, and the positioning mechanism is capable of being locked after the second rail is rotated with respect to the first rail so that the second rails are relatively fixed with the first rail.

Preferably, the mounting frame may include a lifting mechanism, and the bullet-carried rust removal mechanisms are connected onto the lifting mechanism. The lifting mechanism is provided with an elastic component, an end of the elastic component is fixed on the lifting mechanism, and another end of the elastic component is connected with the bullet-carried rust removal mechanisms. When the lifting mechanism drives the bullet-carried rust removal mechanism to move onto a surface to be derusted, a counteracting force of the surface to be derusted against the bullet-carried rust removal mechanism causes the elastic component to contract.

Preferably, the rust removal device may further include the multiple bullet-carried rust removal mechanisms and at least two fixers, and the multiple bullet-carried rust removal mechanisms are respectively fixed on the two fixers. The two fixers are respectively provided with two gear racks in positions of which close to each other. The rust removal device further includes a motor and an output gear, the output gear is meshed with the two gear racks respectively, and the motor is configured to drive the two fixers to move close to or away from each other through the output gear and the two gear racks.

Preferably, the rust removal device may further include fixers arranged on the lifting mechanism, and the bullet-carried rust removal mechanisms are connected to the fixers. Each of the bullet-carried rust removal mechanisms and each of the fixers are disposed with a self-adaptive mechanism therebetween. The self-adaptive mechanism may include a floating part, guiding upright bars, and a securing part. The elastic component is springs sleeved on the guiding upright bars. The securing part is provided with performed holes, an end of each of the guiding upright bars passes through the preformed hole, another end of each of the guiding upright bars is fixedly connected to the bullet-carried rust removal mechanism through the floating part. The springs are capable of being compressed by a counteracting force generated by the bullet-carried rust removal mechanism abutted against the surface to be derusted.

Preferably, the mounting frame may include a deformable mechanism. The bullet-carried rust removal mechanisms are installed on the deformable mechanism, and the deformable mechanism is configured to drive the bullet-carried rust removal mechanism to move.

Preferably, the deformable mechanism may include a base body, a deformation power device, master arms and first driven arms. The deformation power device is fixed on the base body. The deformation power device is hinged with first ends of the master arms, and the second ends of the master arms are hinged with the first driven arms, and the deformation power device is capable of driving the first driven arms close to or away from the base body.

Preferably, the deformation power device may include a motor, a screw rod and a nut. The nut is fixedly connected with the master arms, the motor is configured to drive the screw rod to rotate to thereby drive the nut to move along a lengthwise direction of the screw rod.

Preferably, the deformable mechanism may further include second driven arms. The second driven arms are hinged with the base body, and the bullet-carried rust removal mechanism is connected with one of the first driven arms and one of the second driven arms.

Preferably, the mounting frame may further include a slide rail. The deformable mechanism is arranged on the slide rail, and the deformable mechanism is slidable along the slide rail.

Preferably, the rust removal device may further include a first absorbing chassises and a second absorbing chassises. Each of the first absorbing chassises includes a first absorption device and a first telescopic device, and the first telescopic device is configured to drive the first absorption device to move. Each of the second absorbing chassises includes a second absorption device and a second telescopic device, and the second telescopic device is configured to drive the second absorption device to move. The first absorption device and the second absorption device extend simultaneously in a first state, and the first absorption device and the second absorption device extend alternately in a second state.

The bullet-carried rust removal mechanism of the disclosure has a relatively small volume, and an accurate derusting can be performed on a position to be derusted according to needs.

BRIEF DESCRIPTION OF THE DRAWINGS

The above-mentioned and other objectives, features and advantages of the disclosure will become clearer through more specific description of preferred embodiments of the disclosure shown in the accompanying drawings. In all the drawings, the same reference numerals indicate the same parts, and the drawings are not drawn to scale in equal proportion according to actual sizes, and a main point is to show the gist of the disclosure.

DETAILED DESCRIPTION OF EMBODIMENTS

In order to facilitate the understanding of the disclosure, the disclosure will be described more comprehensively below with reference to the relevant drawings.

It should be noted that when an element is considered to "connected" to/with another element, it may be directly connected to and integrated with another element, or there may be an intermediate element existed therebetween instead. The terms "installed/mounted", "one end", "other end" and similar expressions used herein are for illustrative purposes only.

Unless otherwise stated, all technical and scientific terms used herein have the same meanings as those commonly understood by those skilled in the technical field of the disclosure. The terms used in the specification of the disclosure are only for the purpose of describing specific embodiments, and are not intended to limit the disclosure. The term "and/or" used in the specification includes any and all combinations of one or more related listed items.

With reference to FIG. 1 through FIG. 23, a technical solution proposed by the disclosure is that a bullet-carried rust removal mechanism (also referred to as bullet-carried deruster) may include bullets (also referred to as bullet-like bodies or bullet-shaped bodies) 12. The bullets 12 is capable of doing/performing a linear reciprocating motion driven by an external driving mechanism to repeatedly knock/strike a surface to be derusted. An end of each of the bullets 12 away from the driving mechanism (also referred to as driver) is a knocking portion 1200 for rust removing. Moreover, the knocking portion 1200 may be a tool bit.

Figure 10:
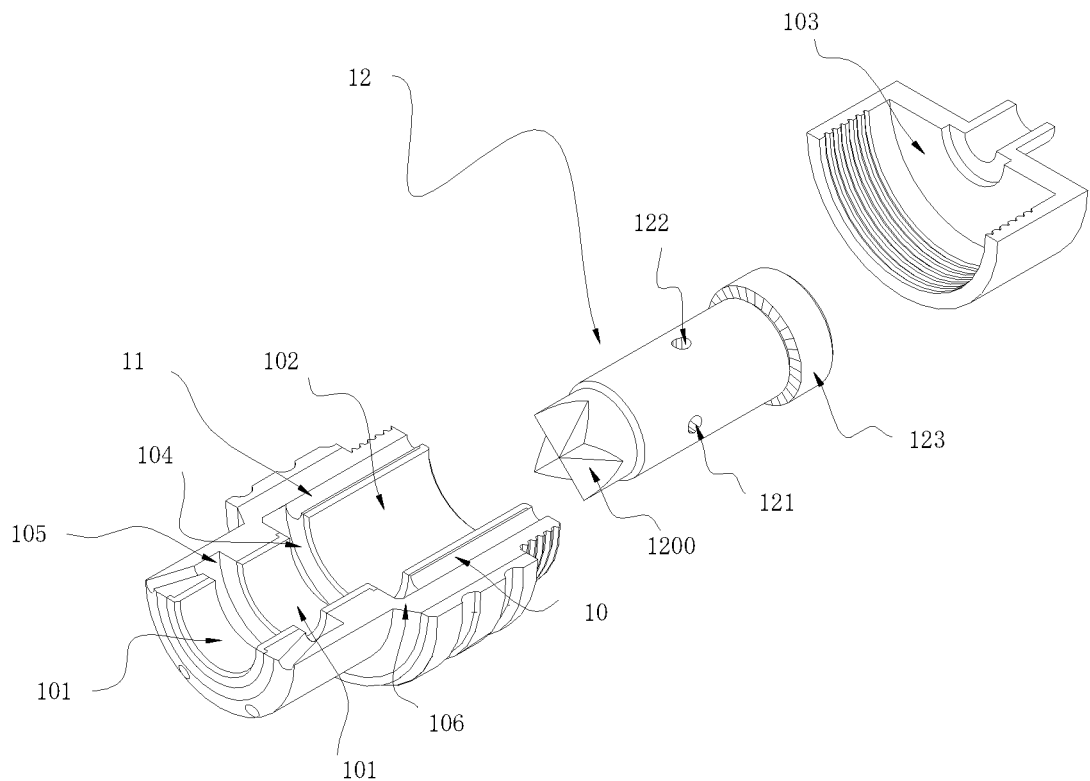
FIG. 10 is a schematic sectional view of a bullet-carried rust removal mechanism in an exploded state according to a preferred embodiment of the disclosure.

Referring to FIG. 10, in a preferred embodiment, the bullet-carried rust removal mechanism may further include a bullet-carried rust removal mechanism base 11. The bullet-carried rust removal mechanism base 11 is provided with a gas receiving cavity 10. The driving mechanism is communicated with the gas receiving cavity 10. The driving mechanism may include a gas distribution mechanism (also referred to as gas dispensing mechanism, or gas distributor). The bullet 12 can be movably embedded in the gas receiving cavity 10, and a side wall of the bullet 12 abuts against an inner wall of the gas receiving cavity 10 to isolate gas pressure in the gas receiving cavity 10 from atmosphere. The gas distribution mechanism introduces gas to the gas receiving cavity 10 to drive the bullet 12 to knock the surface to be derusted, and the bullet 12 returns back/restores after knocking the surface to be derusted.

Figure 11:
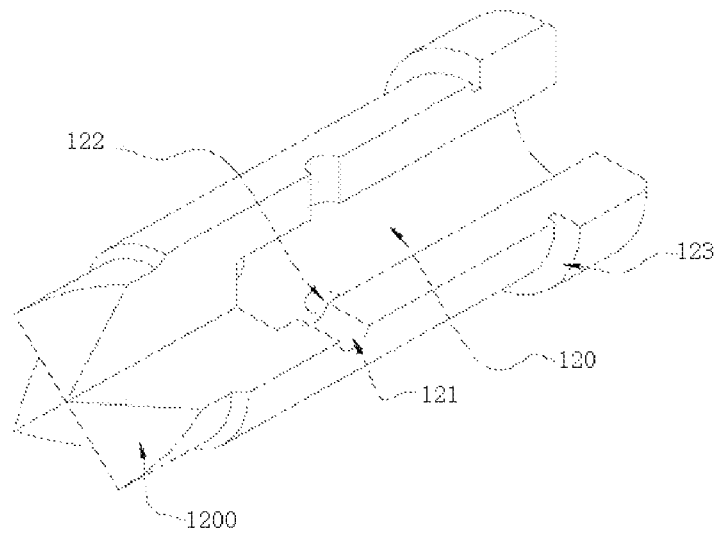
FIG. 11 is a schematic cutaway view of a bullet according to a preferred embodiment of the disclosure.
Figure 12:
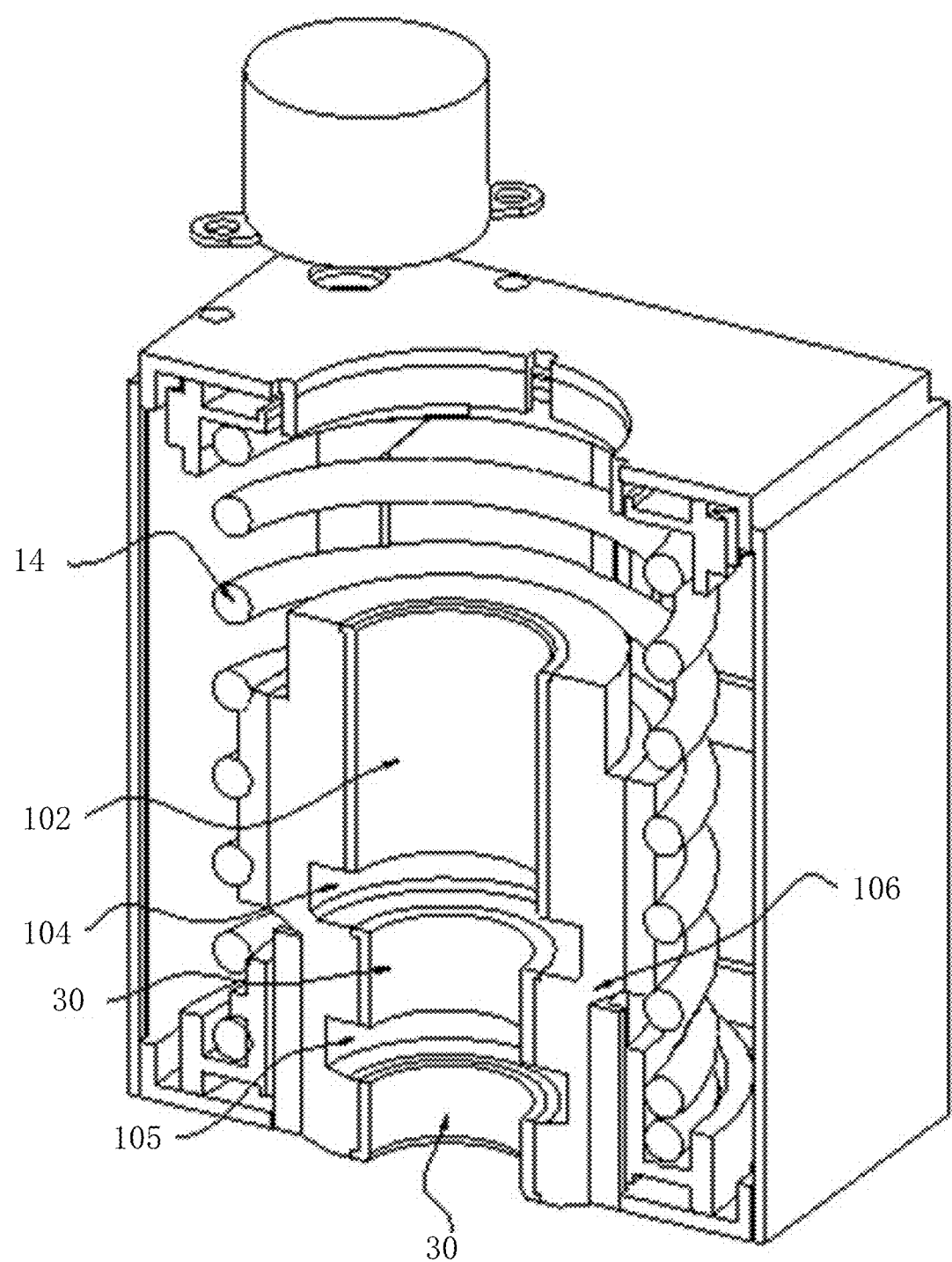
FIG. 12 is a schematic sectional view of a bullet-carried rust removal mechanism base in an assembled state according to an embodiment of the disclosure.
Figure 13:
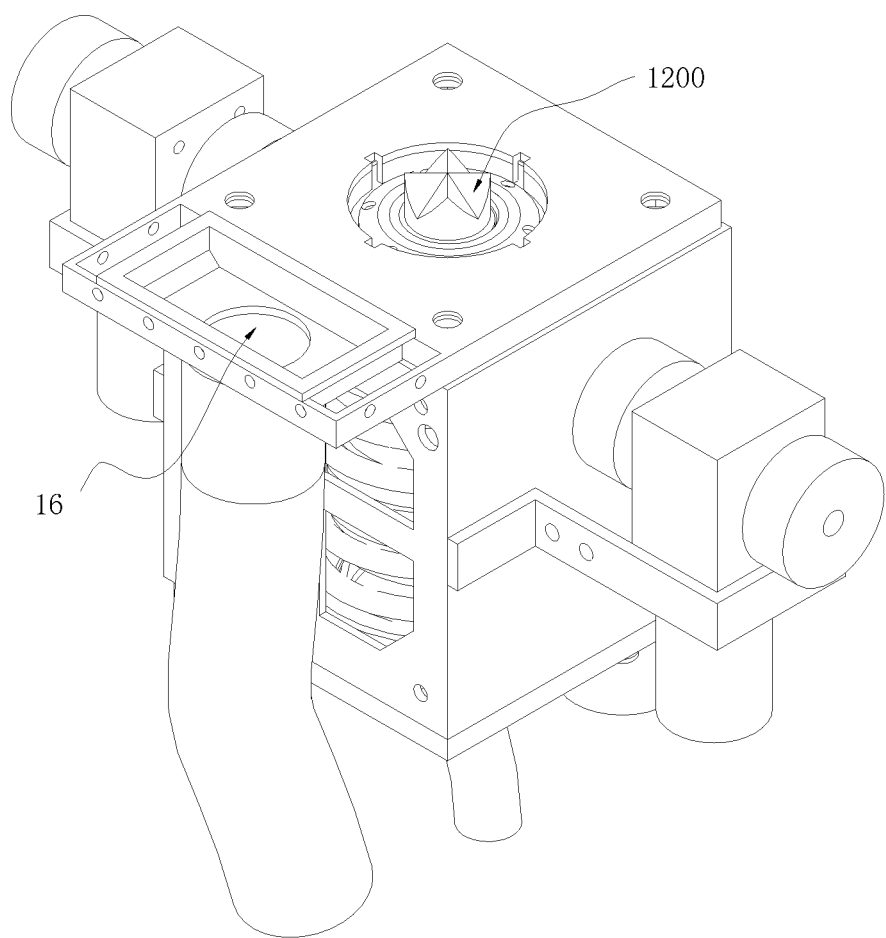
FIG. 13 is a schematic overall structural view of a bullet-carried rust removal mechanism in another perspective according to an embodiment of the disclosure.

Referring to FIG. 10 and FIG. 11, in a preferred embodiment, the bullet-carried rust removal mechanism may further include a buffer cavity 103. The gas receiving cavity 10 includes a guide hole 101 and a piston cavity 102, and the guide hole 101 and the piston cavity 102 are connected and communicated. The bullet 12 can be movably embedded in the guide hole 101, and the side wall of the bullet 12 abuts against an inner wall of the guide hole 101, so that the piston cavity 102 is not communicated with atmospheric pressure. A side wall of the guide hole 101 is provided with a pressure relief stage 105 (also referred to as pressure relief position). The bullet 12 includes an inner cavity 120. A side of the bullet 12 is provided with gas ventilation holes communicated with the inner cavity 120. After the bullet is ejected, a gas pressure in the gas receiving cavity 10 is leakage when the gas ventilation hole is communicated with the pressure relief stage 105. The gas distribution mechanism 31 returns back to an initial position after knocking the surface to be derusted.

In a preferred embodiment, the buffer cavity 103 is arranged between the gas receiving cavity 10 and the gas distribution mechanism 31 so that a connection of the three is a straight line.

Referring to FIG. 10, in a preferred embodiment, the bullet-carried rust removal mechanism may further include a first limit part 123 and a second limit part 106. The first limit part 102 is arranged on the bullet 12, and the second limit part 106 is arranged on a side wall of the gas receiving cavity 10. The first limit part 123 and the second limit part 106 abut against each other when the bullet 12 moves toward an opening of the gas receiving cavity 10 up to an extreme position to thereby prevent the bullet 12 from escaping from the gas receiving cavity 10.

In the preferred embodiment, the first limit part 123 is a ring-shaped bulge on the bullet 12. An inner diameter of the piston cavity 102 is larger than an inner diameter of the guide hole 101. The guide hole 101 and the piston cavity 102 are connected by a connecting part, and the connecting part is the second limiting part 106.

Referring to FIG. 4 through FIG. 9, in a preferred embodiment, a bullet-carried rust removal mechanism base 11 may include a gas receiving cavity 10, and a bullet 12 can be movably embedded in the gas receiving cavity 10. A driving mechanism 15 includes a gas distribution mechanism 31, and the gas distribution mechanism 31 is communicated with the gas receiving cavity 10 for introducing agas into the gas receiving cavity 10 to thereby drive the bullet 12 to move reciprocally relative to the gas receiving cavity 10. Specifically, the rust removal device includes multiple gas distribution mechanisms 31, and each of the multiple gas distribution mechanisms 31 is connected with multiple bullet-carried rust removal mechanisms 1 through pipelines. In another preferred embodiment, a rust removal device includes multiple rust removal modules moving independently of each other. Each of the multiple rust removal modules includes multiple bullet-carried rust removal mechanisms 1 moving synchronously, and each of the multiple rust removal module is connected with one gas distribution mechanism 31.

In a preferred embodiment, a rust removal mechanism mainly includes bullets 12, a gas receiving cavity 10, a buffer cavity 103, a gas distribution mechanism 3, a damping device, a rust recovery device and travel driving mechanisms 15.

Figure 3:
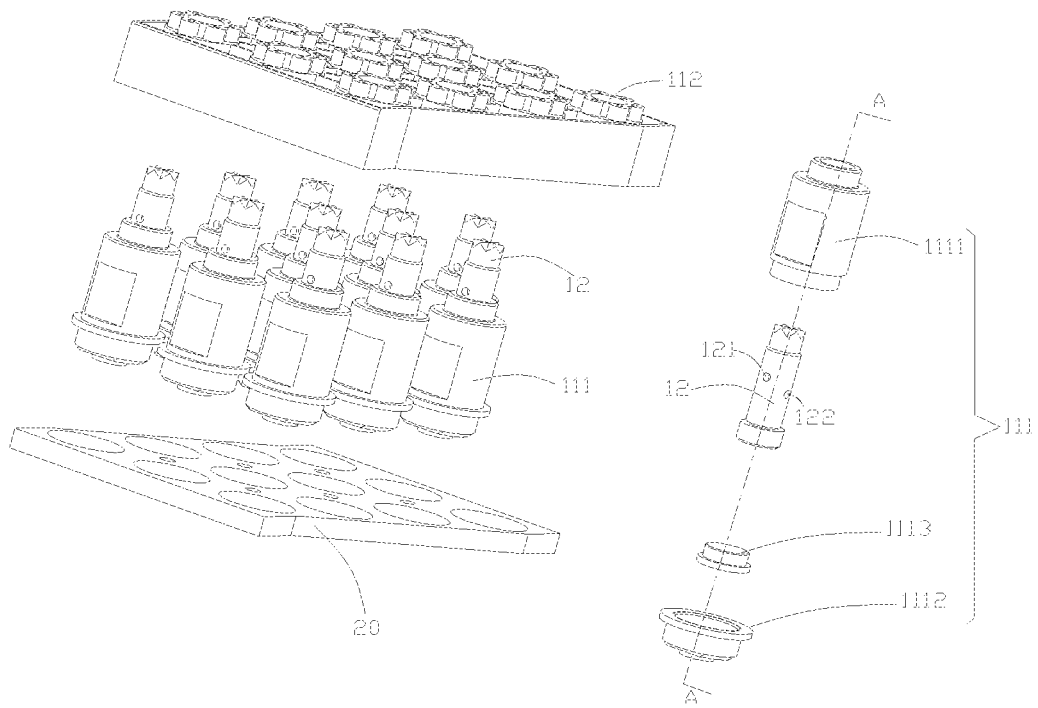
FIG. 3 is a schematic exploded view of a pre-knocking module.
Figure 7:
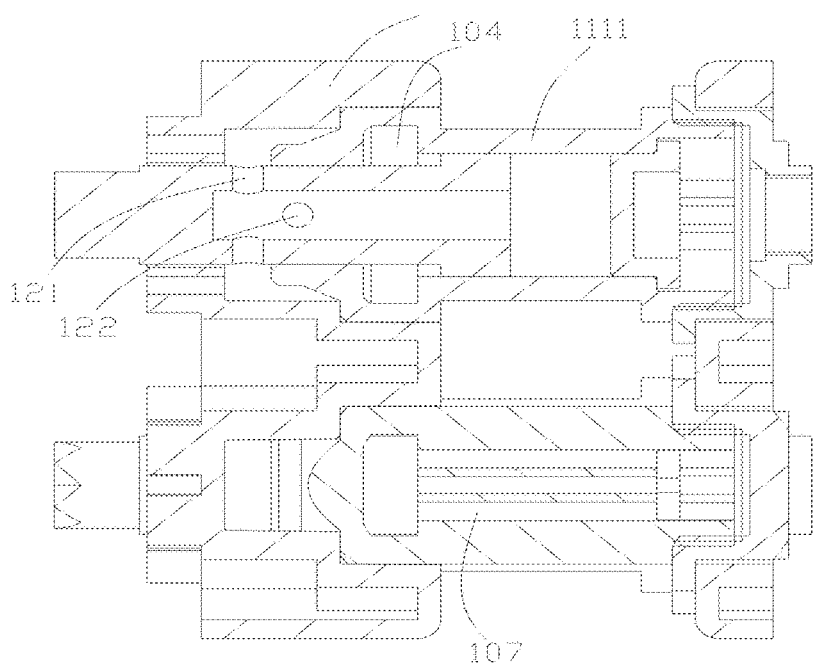
FIG. 7 is a schematic sectional view of a rust removal module of FIG. 6.

Referring to FIG. 3 and FIG. 7, in a further preferred embodiment, a gas receiving cavity 10 may include a guide hole 101 and a piston cavity 102 below the guide hole 101, and the buffer cavity 103 is a part of the piston cavity 102. A space surrounded by an end of the bullet 12 in the piston cavity 101 and a side wall of the piston cavity 101 is the buffer cavity 103, and a size of the space of the buffer cavity 103 changes with a movement of the bullet 12. The bullet 12 is movably installed inside the guide hole 101, and a side wall of the bullet 12 fits with an inner wall of the guide hole 101, so that the piston cavity 102 is not communicated with an external atmosphere. An end of the piston cavity 102 away from the guide hole 101 is provided with a buffer cavity 103. The piston cavity 102 is provided with a pressurization stage 104 (also referred to as pressurization position), the side wall of the piston cavity 102 is provided with a vertical gas passage 107. An opening-end of the gas passage 107 is communicated with the buffer cavity 103, the other opening-end of the gas passage 107 is communicated with the pressurization stage 104. The guide hole 101 is provided with a pressure relief stage 105, and the pressure relief stage 105 is communicated with atmospheric pressure. The pressurization stage 104 and the pressure relief stage 105 are ring-shaped grooves.

Referring to FIG. 7, in a further preferred embodiment, a bullet 12 includes an inner cavity 120, a knocking portion 1200 for removing rust is arranged at a top end of the bullet 12, gas ventilation holes are arranged on a side wall of the bullet 12. The gas ventilation hole may include a first gas ventilation hole 121 and a second gas ventilation hole 122. When the bullet 12 is not moving, the second gas ventilation hole 122 is aligned with the pressurization stage 104, and the first gas ventilation hole 121 is closed by a side wall of the guide hole 101 in the guide hole 101, so that the inner cavity 120 and the piston cavity 102 are isolated from an external atmosphere. Therefore, when the gas distribution mechanism 31 introduces gas into the buffer cavity 103 for pressurization, the gas enters the pressurization stage 104 from the buffer cavity 103 through the gas passage 107 of the piston cavity 102, and the gas in the pressurization stage 104 enters the inner cavity 120 from the second gas ventilation hole 122 so that the gas pressure in the inner cavity 120 is equal to the gas pressure in the piston cavity 102. At this time, there is a pressure difference between the piston cavity 102 and the external atmospheric pressure, which pushes the bullet 12 moves toward the guide hole 101. The bullet 12 is pushed away from the piston cavity 102 by gas pressure until the first gas ventilation hole 121 is operatively aligned with the pressure relief stage 105, so that the gas in the inner cavity 120 is discharged/leaked into the external atmosphere. Since the second gas ventilation hole 122 leaves the pressurization stage 104 and is closed by the inner wall of the guide hole 101, and a certain pressure is maintained in the piston cavity 102. Therefore, when the bullet 12 returns back after knocking an object to be derusted, the piston cavity 102 can act as an air cushion to prevent the bullet 12 from knocking a cavity bottom of the buffer cavity 103 when the bullet 12 returns back. In order to ensure that each return of the bullet 12 can return to an initial position, that is, a position of the first gas ventilation hole 121 aligned with the pressurization stage 104, prevent the returned bullet 12 from knocking the buffer cavity 103, and a damping spring facing toward the bullet 12 is arranged in the buffer cavity 103. When the bullet 12 returns back, the bullet 12 knocks a damping spring to slow down, so that the second gas ventilation hole 122 is capable of being aligned with the pressurization stage 104.

Figure 6:
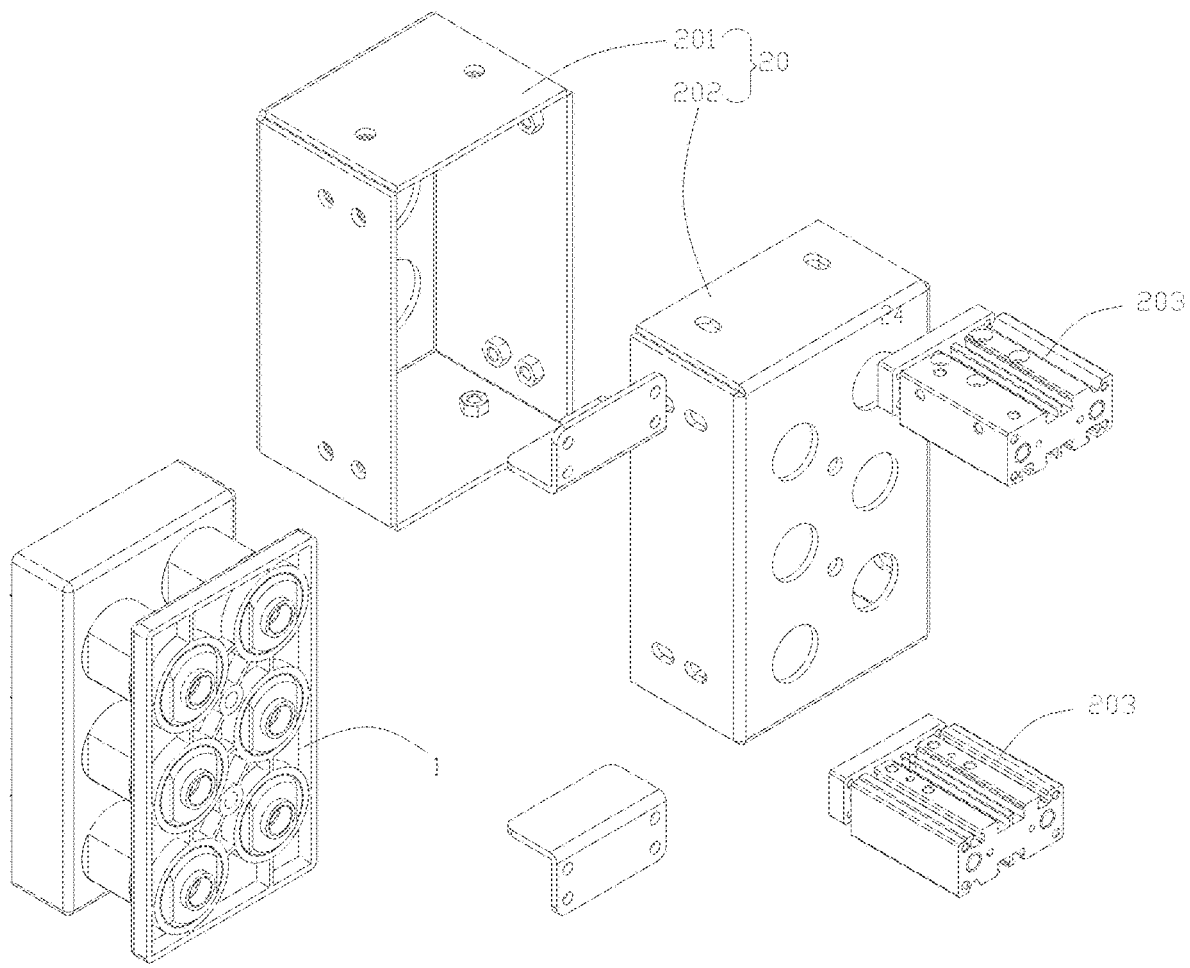
FIG. 6 is a schematic exploded view of a post-knocking module.

Referring to FIG. 6, in a further preferred embodiment, a piston cavity 102 is relatively wide and the guide hole 101 is relatively narrow, and a cross section is similar to a shape as Chinese "凸". The piston cavity 102 and a guide hole 101 are connected through a connecting part, and a second limit part 106 is formed at the connecting part. A lower part of the bullet 12 is provided with a flank, and the flank is the first limit part 123. When the bullet extends the longest, the second limit part 106 abuts against the first limit part 123 thereby causing the bullet 12 cannot continue to extend. At this time, the knocking portion 1200 of the bullet 12 has extended out from a cavity opening of the gas receiving cavity 10, and the object to be derusted can be obtained for removing rust. A purpose of the setting is to prevent the bullet 12 from escaping from the guide hole 101.

Figure 8:
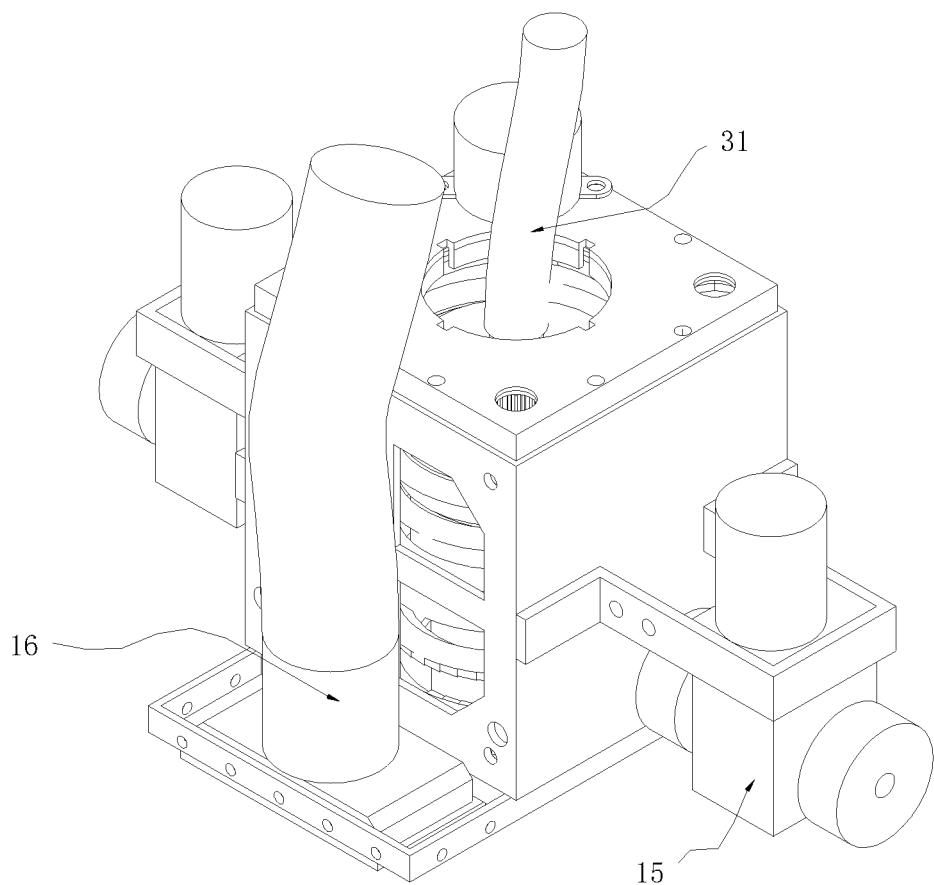
FIG. 8 is a schematic overall structural view associated with a bullet-carried rust removal mechanism according to a preferred embodiment of the disclosure.
Figure 9:
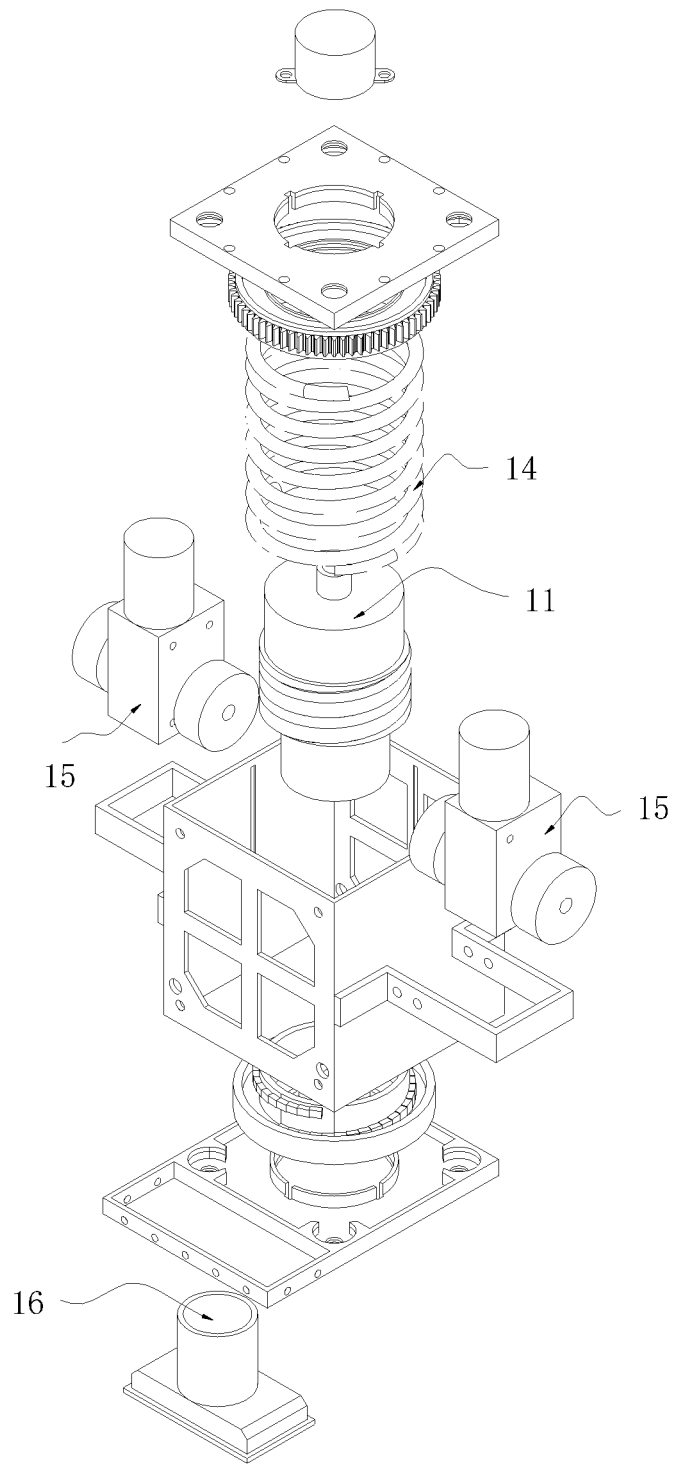
FIG. 9 is a schematic exploded view associated with a bullet-carried rust removal mechanism according to a preferred embodiment of the disclosure.

Referring to FIG. 8, in the related art, the gas distribution mechanism 31 is arranged on a side of the pressurization stage 104 and directly sprays gas into the pressurization stage 104. Disadvantages of this solution is that the high-speed air flow will disturb a movement of the bullet 12, resulting in a decrease of a speed of the bullet 12, a whole cycle of rebound and ejection becomes longer, the number of actions per unit time of the bullet 12 becomes less, and an ideal rust removal effect cannot be achieved. Therefore, in the disclosure, the gas distribution mechanism 31 is arranged below the buffer cavity 103, a connecting line of the buffer cavity 103, the piston cavity 102 and the guide hole 101 are in a straight line (in which a central axis is located on the same straight line). A gas outlet of the gas distribution mechanism 31 is staggered with a gas inlet of the gas passage 107, so that the buffer cavity 103 plays a role of primary buffer and avoids the kinetic energy of the ejected gas directly interfering with the bullet 12. Instead, the bullet 12 is driven by gas pressure, which is conducive to improving action times of the bullet 12 per unit time.

In a preferred embodiment, the rust removal device may further include linear motion driving mechanisms 15 configured for driving the gas receiving cavity 10 close to or away from the object to be derusted. The rust removal device may further include a damping spring 14 and a dust absorbing pipe 16. The damping spring is sleeved outside the gas receiving cavity 10. The dust absorbing pipe 16 may include a rust recovery opening arranged on a side of the bullet 12, and the dust absorbing pipe 16 is communicated with the rust recovery opening.

In a preferred embodiment, a bullet-carried rust removal mechanism base 11 includes a first body 111 and a second body 112, the first body 111 is connected with the second body 112. A pressurization stage 104 is formed on the first body 111, a pressure relief stage 105 is formed on the second body 112, and a gas receiving cavity 10 is formed between the first body 111 and the second body 112. A bullet outlet for the knocking portion 1200 of the bullet 12 to pass through is formed on the second body 112. When the bullet 12 is in an extended state, the gas receiving cavity 10 and the pressure relief stage 105 are communicated, and the gas receiving cavity 10 and the pressurization stage 104 are not communicated. When the bullet 12 is in a retracted state, the gas receiving cavity 10 and the pressure relief stage 105 are not communicated, and the gas receiving cavity 10 and the pressurization stage 104 are communicated.

Figure 4:
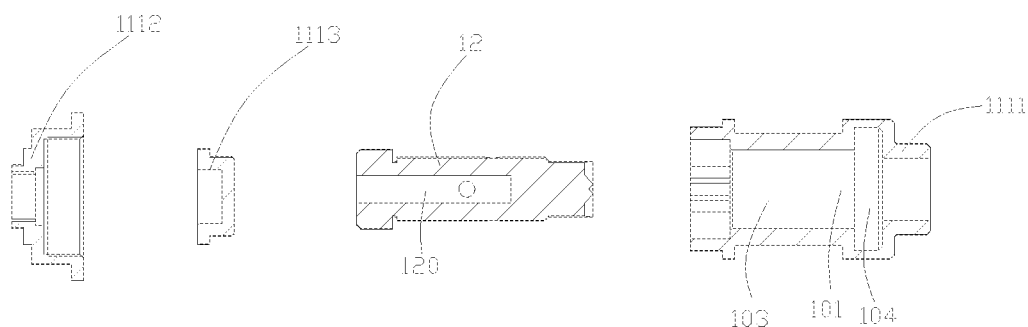
FIG. 4 is a schematic sectional view taken along the A-A direction of FIG. 3.
Figure 5:
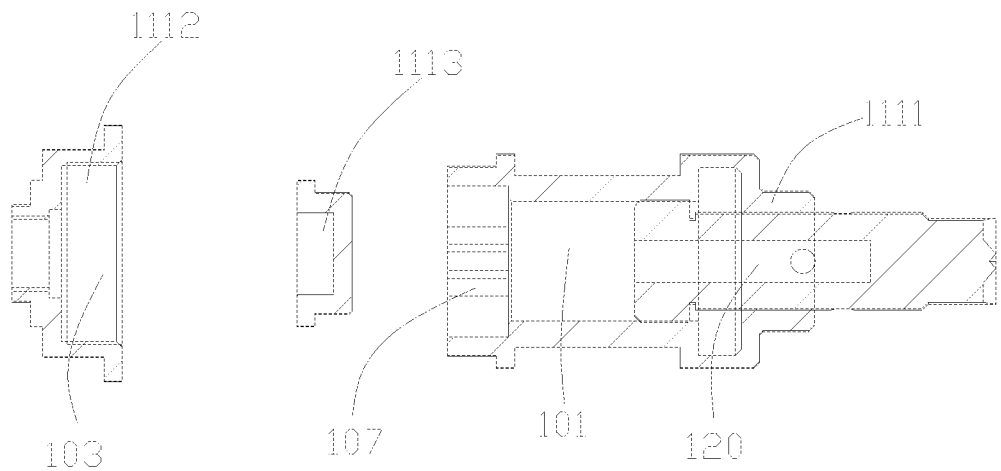
FIG. 5 is a schematic sectional view of a bullet-carried rust removal mechanism of FIG. 4 during assembling.

Referring to FIG. 3 through FIG. 5, in a preferred embodiment, the bullet-carried rust removal mechanism base 11 may include a first body 111 and a second body 112, the first body 111 and the second body 112 are connected. Specifically, the first body 111 and the second body 112 are snapped and fixedly connected with each other, or are fixedly connected by bolts. A piston cavity 101, a buffer cavity 103 and a gas passage 107 are formed inside the first body 111. The buffer cavity 103 is located at an upper part of the piston cavity 102 and is arranged in a same line with the piston cavity 102. Further, the buffer cavity 103 is a part of the piston cavity 102, and a cavity surrounded by a connecting end of the bullet 12 (i.e., an end located in the piston cavity 102) and part of a side wall of the piston cavity 102 is the buffer cavity 103. A pressurization stage 104 is formed on a side wall of the piston cavity 102. The pressurization stage 104 is communicated with the buffer cavity 103 through the gas passage 107. The gas distribution mechanism 31 introduces high-pressure gas into the buffer cavity 103 and then enters the pressurization stage 104. A guide hole 101 is formed on the second body 112, a pressure relief stage 105 is arranged on a side wall of the guide hole 101, and the knocking portion 1200 of the bullet 12 can pass through the guide hole 101 and extend out from the guide hole 101. An inner cavity 120, a first gas ventilation hole 121 and a second gas ventilation hole 122 are formed on the bullet 12, and both the first gas ventilation hole 121 and the second gas ventilation hole 122 are communicated with the inner cavity 120. When the bullet 12 is retracted, the second gas ventilation hole 122 is communicated with the pressurization stage 104, the first gas ventilation hole 121 is closed by the side wall of the guide hole 101, the high-pressure air flow enters the bullet inner hole 120 through the buffer cavity 103, the pressurization stage 104 and the second gas ventilation hole 122, and thereby keeping a pressure between the inner cavity 120 and the buffer cavity 103 balanced and higher than the atmospheric pressure. When the pressure increases, the bullet 12 can be pressed downward so that the bullet 12 extends and knocks on material 800. When the bullet 12 in an extended state, the first gas ventilation hole 121 is communicated with the pressure relief stage 105, and the second gas ventilation hole 122 is closed by the side wall of the piston cavity 102. After the first gas ventilation hole 121 is communicated with the pressure relief stage 105 on the second body 112, the high pressure in the inner cavity 120 is leaked from the pressure relief stage 105. After the bullet 12 knocks a plate to be derusted, it will also form a strong rebound force to make the bullet 12 bounce back and restore quickly. Since the pressure in the buffer cavity 103 still exists, the gas in the buffer cavity 103 forms an air cushion, which can cushion a rebound force of the bullet 12, reduce or even avoid an impact between the connecting end of the bullet 12 and the piston cavity 102, reduce wear and prolong a service life of the rust removal device. A specific gravity of material of the second body 112 is lower than a specific gravity of material of the first body 111. By dividing the bullet-carried rust removal mechanism base 11 into the first body 111 and the second body 112, a weight of the rust removal device can be reduced and the cost can be saved without affecting a performance of the rust removal device.

Specifically, the first body 111 is made of stainless steel, and the second body 112 is made of plastic, aluminum alloy or other materials. The first body 111 includes a piston cylinder 1111, an inner cover 1113 and an outer cover 1112. The piston cavity 102 is located inside the piston cylinder 1111, the bullet 12 passes through the piston cavity 102, and an end of the bullet 12 is snapped in the piston cavity 102. The outer cover 1112 is fixed on the piston cylinder 1111, the buffer cavity 103 is surrounded by the outer cover 1112, the inner cover 1113 and the piston cylinder 1111, and the inner cover 1113 is located between the piston cavity 102 and the buffer cavity 103. When the bullet 12 is extended, the bullet 12 and the inner cover 1113 seal the piston cavity 103, the inner cover 1113 and the outer cover 1112 seal the buffer cavity 103 and inflate the buffer cavity 103. The gas enters the piston cavity 102 through the gas passage and then enters the inner cavity 120. When the gas pressure is large enough, the bullet 12 is pressed out and the bullet 12 is knocked on material 800. After being impacted, the bullet 12 is restored, and the bullet 12 presses the inner cover 1113 against the buffer cavity 103. The gas in the buffer cavity 103 forms the air cushion to buffer the bullet 12 and the inner cover 1113, so as to reduce the impact force and prolong the service life.

In a further preferred embodiment, the first body 111 is made of a metal material and the second body 112 is made of a plastic material. Specifically, the first body 111 is made of stainless steel, and the second body 112 is made of plastic, such as Polycarbonate (PC)/Styrene Acrylonitrile (SAN), Polycarbonate (PC)/Polybutylene Terephthalates (PBT), Polycarbonate (PC)/Polypropylene (PP), etc. Further, the first body 111 includes a piston cylinder 1111, an inner cover 1113 and an outer cover 1112. Both ends of the piston cylinder 1111 are respectively provided with an opening, the bullet 12 passes through from the first end of the piston cylinder 1111 into the second end of the piston cylinder 1111, and the connecting end of the bullet 12 is located inside the piston cylinder 1111. The inner cover 1113 is fixed inside the first end of the piston cylinder 1111, the inner cover 1113 and is fixed outside the piston cylinder 1111, and the outer cover 1112 covers the inner cover 1113. In another embodiment, the first body 111 includes a piston cylinder 1111, an inner cover 1113 and an outer cover 1112. The piston cavity 102 is located inside the piston cylinder 1111, the bullet 12 passes through the piston cavity 102, and the other end of the bullet is snapped in the piston cavity 102. The outer cover 1112 is fixed on the piston cylinder 1111. The inner cover 1113 is located between the piston cavity 102 and the buffer cavity 103, the bullet 12 and the inner cover 1113 seal the piston cavity 1111, and the inner cover 1113 and the outer cover 1112 seal the buffer cavity 103. When the bullet 12 is extended, the inner cover 1113 is pressed toward the piston cavity 1111 by gas pressure. When the bullet 12 is restored, the bullet 12 presses the inner cover 1112 toward the buffer cavity 103.

Referring to FIG. 3, in a preferred embodiment, at least some of the second bodies 112 of the bullet-carried rust removal mechanisms 1 are connected to form a one-to-one piece. It makes the structure more stable and can better resist the impact force formed during pressure relief. Further, all second bodies 112 on each rust removal module are integrally cast. Each rust removal module includes bullets 12 in a 4*3 array or a 5*4 array. Each bullet 12 is provided with a second body 112, and multiple second bodies 112 are cast as a one-to-one piece.

Referring to FIG. 3, FIG. 4, FIG. 5 and FIG. 17, in a preferred embodiment, the rust removal mechanism 1 includes a bullet-carried rust removal mechanism base 11 and a bullet 12. A piston cavity 102 and a buffer cavity 103 are arranged in the bullet-carried rust removal mechanism base 11. The first end of the bullet 12 is located inside the piston cavity 102, and the second end is formed with a rust removal portion that can extend out of the piston cavity 102. The rust removal portion is configured for removing rust materials or breaking materials. An inner cover 1113 is arranged between the piston cavity 102 and the buffer cavity 103. The inner cover 1113 separates the piston cavity 102 and the buffer cavity 103, and the inner cover 1113 can move in the buffer cavity 103. When the bullet 12 returns, the bullet 12 first knocks against with the inner cover 1113, and there is high-pressure gas in the buffer cavity 103. When a buffer moves in the buffer cavity 103, the high-pressure gas acts as a buffer to prevent the bullet 12 from being damaged. A diameter of the buffer cavity 103 is larger than a diameter of the piston cavity 102, and the piston cavity 102 is coaxial with the buffer cavity 103. A step is formed between the piston cavity 102 and the buffer cavity 103. An end of the inner cover 1113 located in the buffer cavity 103 is pressed on the step. After the bullet 12 collides with the inner cover 1113, the buffer cavity 103 can play a buffer role. The bullet-carried rust removal mechanism base 11 is provided with a pressurization stage 104 and a pressure relief stage 105. When the bullet 12 is in a retracted state, the piston cavity 102 and the pressure relief stage 105 are not communicated, the buffer cavity 103, the piston cavity 102 and the pressurization stage 104 are communicated with each other. The high-pressure gas (it can also be liquid) first enters the buffer cavity 103, then enters the pressurization stage 104 from the gas passage 107, and then enters the piston cavity 102 from the pressurization stage 104. When the pressure in the piston cavity 102 is large enough, the bullet 12 can be pressed out of the piston cavity 102 to make the rust removal portion of the bullet 12 knock the materials for removing rust and breaking the material. When the bullet 12 is in an extended state, the piston cavity 102 and the pressure relief stage 105 are communicated, and the piston cavity 102 and the pressurization stage 104 are not communicated. After the piston cavity 102 and the pressure relief stage 105 are communicated, the gas in the piston cavity 102 can be released, the gas pressure in the piston cavity 102 decreases, the rebound force formed after the bullet 12 collides with the material makes the bullet 12 return back quickly, and then extend again.

Referring to FIG. 3 through FIG. 6 and FIG. 17, in a further preferred embodiment, an inner cavity 120, a first gas ventilation hole 121 and a second gas ventilation hole 122 are formed on the bullet 12. The first gas ventilation hole 121 and the second gas ventilation hole 122 are communicated with the inner cavity 120, and the inner cavity 120 is formed with an opening at a first end of the bullet 12 to thereby communicate the inner cavity 120 with the piston cavity 102. The high-pressure gas (it can also be liquid) first enters the buffer cavity 103, then enters the pressurization stage 104 from the gas passage 107, and then enters the piston cavity 102 from the pressurization stage 104.

Referring to FIG. 3 through FIG. 6 and FIG. 17, in a further preferred embodiment, the bullet-carried rust removal mechanism base 11 may further include a piston cylinder 1111 and an outer cover 1112. The piston cavity 102 is located inside the piston cylinder 1111 and passes through both ends of the piston cylinder 1111. The buffer cavity 103 is located inside the outer cover 1112 and is arranged as an opening towards an end of the piston cavity 102. The inner cover 1113 seals the piston cavity 102 and the buffer cavity 103 at the same time. The inner cover 1113 can not only seal the piston cavity 102, but also move in the buffer cavity 103. Further, the first end of the inner cover 1113 is matched with the piston cavity 102, and the second end of the inner cover 1113 is matched with the buffer cavity 103.

Figure 17:
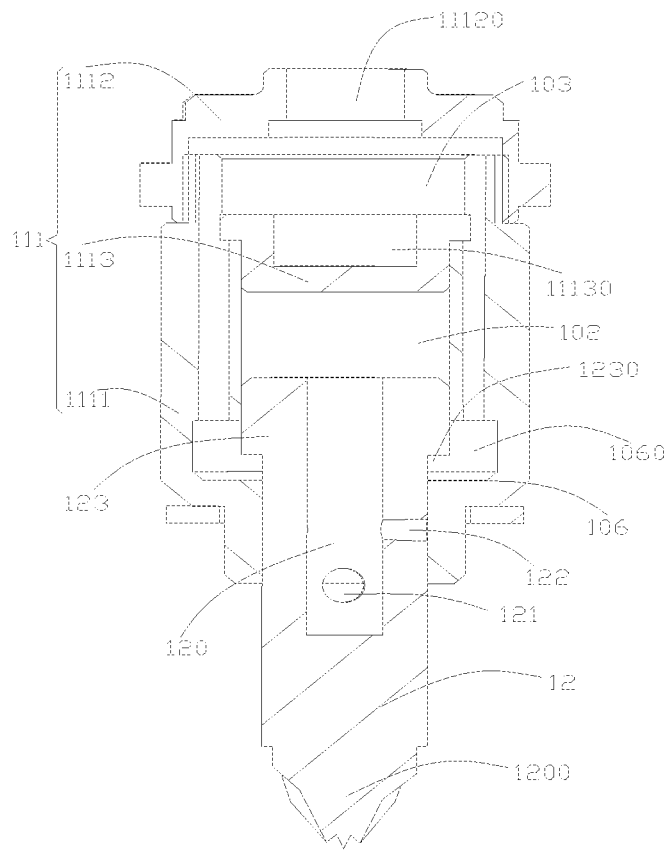
FIG. 17 is a schematic cross-sectional view of a bullet-carried rust removal mechanism according to a preferred embodiment of the disclosure.

Referring to FIG. 17, in a further preferred embodiment, a second end face of the inner cover 1113 is provided with a gas tighten groove 11130, which is communicated with the buffer cavity 103. By setting the gas tighten groove 11130, the inner cover 1113 can be tightly abutted against an end of a side wall of the piston cavity 102, and the sealing effect is better.

In a further preferred embodiment, a gas passage 107 is formed on a side wall of the bullet-carried rust removal mechanism base 11. An end of the gas passage 107 is communicated with the buffer cavity 103, and the other end is communicated with the piston cavity 102.

Referring to FIG. 17, in a further preferred embodiment, the first end of the bullet 12 is formed with a first limit part 123, a diameter of the first limit part 123 is larger than a diameter of the bullet 12. A second limit part 106 matched with the first limit part 123 is arranged on a side wall of the piston cylinder 1111, and a diameter of the second limit part 106 is matched with the diameter of the bullet 12. The pressurization stage 104 is located on the second limit part 106, and an opening of the pressurization stage 104 faces toward the first limit part 123. Before the material is knocked for the first time, there is no high-pressure gas in the buffer cavity 103 and piston cavity 102, but the bullet 12 is suspended due to its own gravity. When the buffer cavity 103 is filled with high-pressure gas, the high-pressure gas applies pressure to the second limit part 106 through the pressurization stage 104, and forcing the bullet 12 to retract into the piston cavity 102 until the pressurization stage 104 is communicated with the buffer cavity 103. Referring to FIG. 17, in a further preferred embodiment, the second limit part 106 is provided with a second gas accommodating groove 1060, and the gas passage 107 and the pressurization stage 104 are both communicated with the second gas accommodating groove 1060. The first limit part 123 is provided with a first gas accommodating groove 1230, and an opening of the first gas accommodating groove 1230 faces toward the second limit part 106. That is, the first gas accommodating groove 1230 and the second gas accommodating groove 1060 are communicated with each other.

Figure 18:
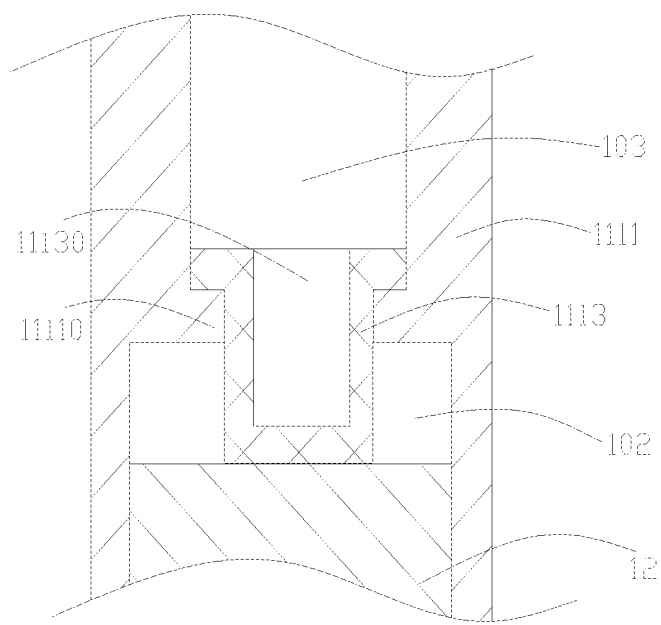
FIG. 18 is a schematic cross-sectional view of a bullet-carried rust removal mechanism according to another preferred embodiment of the disclosure.

Referring to FIG. 18, in another preferred embodiment, a diameter of the buffer cavity 103 is equal to or less than a diameter of the piston cavity 102, a convex ring 11110 is arranged between the piston cavity 102 and the buffer cavity 103. The first end of the inner cover 1113 is matched with an inner wall of the convex ring 11110, the second end of the inner cover 1113 is matched with the buffer cavity 103, and the inner cover 1113 extends into the piston cavity 102.

In a preferred embodiment, the driving mechanism 15 is communicated with the buffer cavity 103, and the driving mechanism 15 supplies compressed fluid into the buffer cavity 103. The bullet 12 reciprocates with respect to a knocking mechanism body under a driving of the compressed fluid.

Referring to FIG. 19 through FIG. 23, in a preferred embodiment, the bullet 12 includes a bullet body and a knocking portion 1200. The bullet body includes a first limit part 123 and a middle part, a diameter of the first limit part 123 is larger than a diameter of the middle part, and the middle part is located between the first limit part 123 and the knocking portion 1200. An end of the bullet body is connected with the knocking portion 1200, and the other end is provided with the first limit part 123. The diameter of the first limit part 123 is larger than that of the bullet body. The bullet body is provided with an inner cavity 120 and gas ventilation holes. The inner cavity 120 penetrates an end face of the first limit part 123, the gas ventilation holes are located on a side wall of the bullet body, and the gas ventilation holes are communicated with the inner cavity 120 for pressurization or pressure relief. There can be only one gas ventilation hole, that is, the pressure and pressure relief use the same gas ventilation hole. There may also be two gas ventilation holes, such as a first gas ventilation hole 121 for pressure relief and a second gas ventilation hole 122 for pressurization. A knocking surface of the knocking portion 1200 is arranged unevenly to increase a contact area between the knocking surface and the materials, increase a stress per unit area of the materials, and improve the effect of rust removal.

In a preferred embodiment, a first gas accommodating groove 1230 is arranged at a position where the first limit part 123 is connected with the bullet body. The first gas accommodating groove 1230 surrounds the bullet body. Before a first knock, the bullet 12 is suspended in the piston cavity, and the first gas accommodating groove 1230 is configured to press the bullet 12 into the piston cavity 102. A diameter of the knocking portion 1200 is smaller than a diameter of the bullet body, and the knocking portion 1200 is coaxial with the bullet body. The knocking surface of the knocking portion 1200 is provided with a wear-resistant layer to increase the wear resistance and improve the service life. Specifically, the wear-resistant layer is chromium carbide wear-resistant metal material, high manganese steel wear-resistant material or tungsten carbide metal wear-resistant material, etc.

In a preferred embodiment, the gas ventilation holes include a first gas ventilation hole 121 and a second gas ventilation hole 122. A vertical distance from the first gas ventilation hole 121 to the knocking portion 1200 is less than a vertical distance from the second gas ventilation hole 122 to the knocking portion 1200. Projections of the first gas ventilation hole 121 and the second gas ventilation hole 122 on a plane perpendicular to the central axis of the bullet body do not coincide. During a process of releasing gas, a counteracting force will be generated on the bullet 12 to force the bullet 12 to rotate.

In a preferred embodiment, a knocking surface of the knocking portion 1200 is provided with multiple knocking convex edges 1201 and multiple knocking grooves 1202. The knocking convex edges 1201 and the knocking grooves 1202 are arranged alternately with striking points spread on the knocking surface, so that an area of the knocking will not become smaller, the stress per unit area will increase, and the rust will be removed at a position not in contact with the knocking surface due to a high-frequency vibration.

Figure 19:
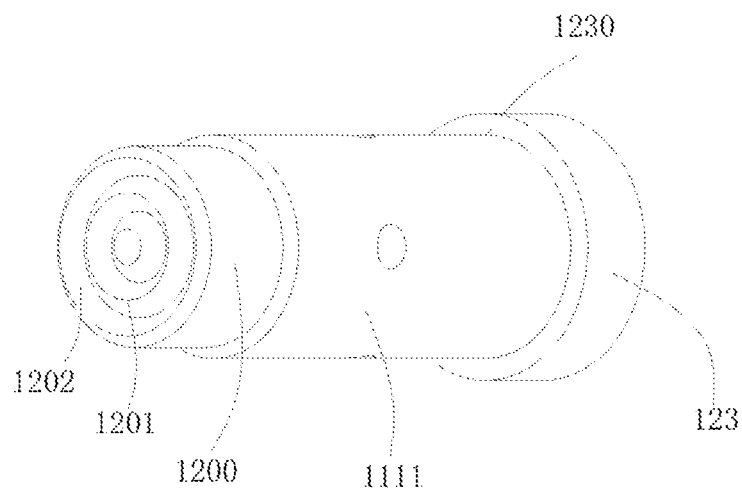
FIGS. 19-23 are schematic overall structural views of bullets according to different embodiments of the disclosure.
Figure 20:
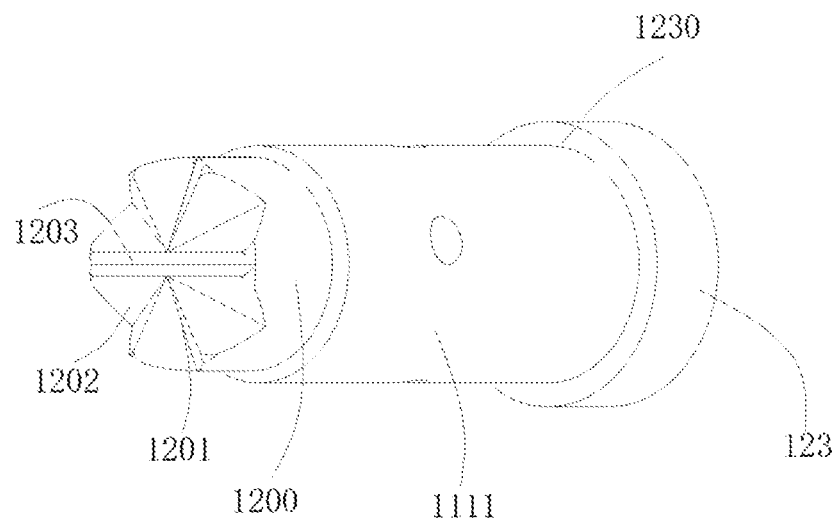
Figure 21:
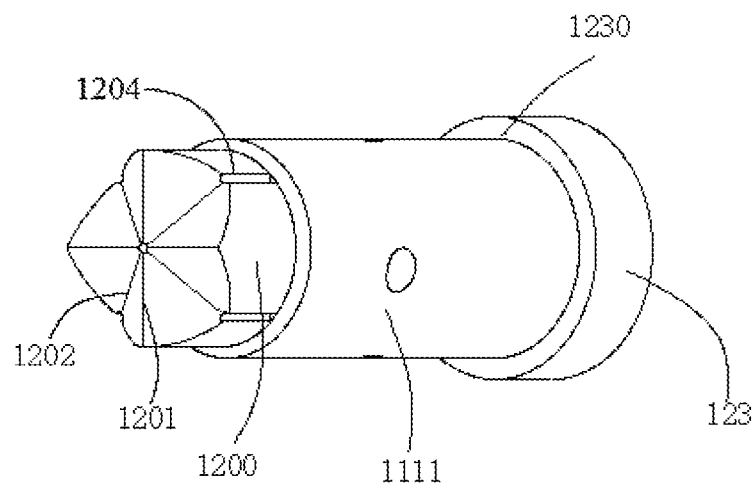
Figure 22:
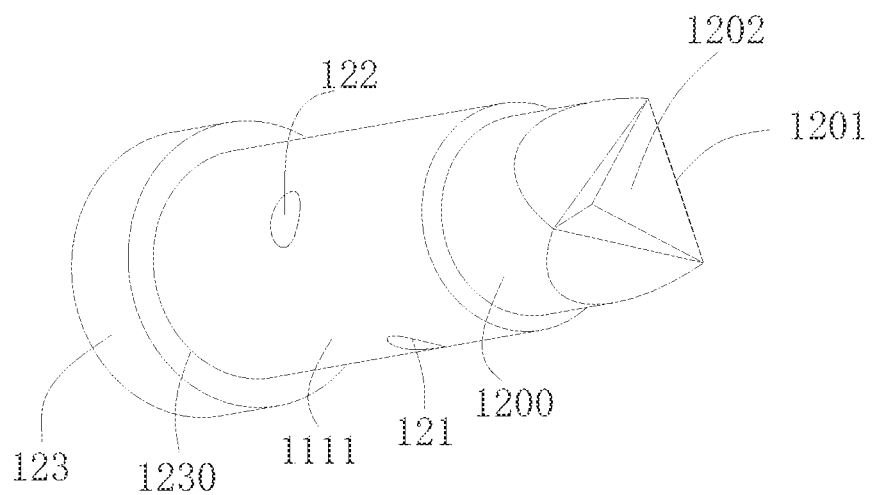
Figure 23:
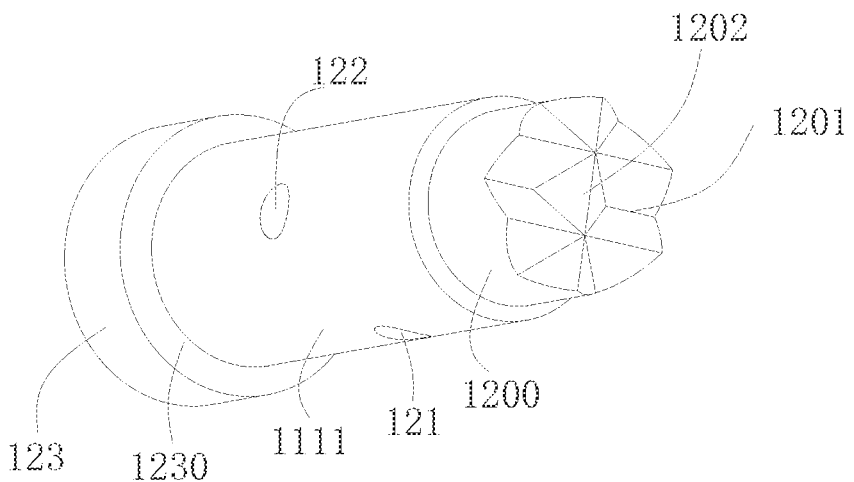

Referring to FIG. 19, in a preferred embodiment, the knocking surface of the knocking portion 1200 is provided with knocking grooves 1202 with a ring shape and knocking convex edges 1201 with a ring shape. Central axes of the knocking convex edges 1201 with a ring shape and the knocking grooves 1202 with a ring shape are the same, and the knocking grooves 1202 and the knocking convex edges 1201 are spaced from each other. Referring to FIG. 20 and FIG. 21, in another preferred embodiment, the knocking surface of the knocking portion 1200 is provided with multiple knocking convex edges 1201 and multiple knocking grooves 1202. The multiple knocking convex edges 1201 and the multiple knocking grooves 1202 are spaced from each other, and the knocking convex edges 1201 and the knocking grooves 1202 are distributed radially around a central axis of the bullet body. Further, the knocking surface is provided with a transverse groove 1203, the transverse groove 1203 extends from a side of the knocking portion 1200 to the other side of the knocking portion 1200, and the transverse groove 1203 penetrates the central axis of the knocking portion 1200. The knocking portion 1200 is provided with vertical grooves 1204. The vertical grooves are parallel to the central axis of the knocking portion 1200, and the vertical grooves 1204 extend from the knocking surface of the knocking portion 1200 to the other end of the knocking portion 1200. Referring to FIG. 22, in further another preferred embodiment, the knocking portion 1200 is provided with multiple knocking convex edges 1201, the multiple knocking convex edges 1201 are connected head to tail, the multiple knocking convex edges 1201 are arranged around a central axis of the knocking portion 1200, and a knocking groove 1202 is formed between the multiple knocking convex edges 1201. Referring to FIG. 23, in other embodiments, the knocking portion 1200 is provided with multiple knocking convex edges 1201, and a knocking groove 1202 is formed between the adjacent knocking convex edges 1201, in which some knocking convex edges 1201 are distributed radially around a same point.

Referring to FIG. 1 through FIG. 9, a rust removal device (also referred to as derusting device) is further provided by the disclosure. The rust removal device may include a mounting frame 40 and bullet-carried rust removal mechanisms 1. Multiple bullet-carried rust removal mechanisms 1 form a rust removal module, and the rust removal module is installed on the mounting frame 40.

The rust removal module includes a driving mechanism 15 and multiple bullet-carried rust removal mechanisms 1 arranged side by side. Each bullet-carried rust removal mechanism 1 may include bullets 12 and a bullet-carried rust removal mechanism bases 11 connected with the bullets 12. An end of each of the bullets 12 is provided with a knocking portion 1200, and the bullet 12 reciprocates with respect to the bullet-carried rust removal mechanism base 11 under a driving of the driving mechanism 15. An end of each of the bullets 12 is connected with the bullet-carried rust removal mechanism base 11, the other end of each of the bullet 12 is a free end, and an object to be derusted is close to the free ends of the bullets 12. When the bullet 12 reciprocates, the free ends of the bullets 12 knock the object to be derusted (material 800 is generally a metal plate, such as steel plate, iron plate, etc.), and the rust on a surface of the object to be derusted is removed by knocking vibration. At the moment when the bullet 12 knocks the material 800, the material 800 is fixed by an external force, and an overall vibration amplitude of the material 800 is small. Therefore, compared with the existing rust removal device, the rust removal device of the disclosure produces less noise. Due to a uniform distribution of the bullets 12, the force during knocking is also evenly distributed, and the rust removal effect is relatively stable.

Referring to FIG. 3, in a preferred embodiment, the rust removal device includes multiple rust removal modules 10 moving independently of each other, and each of the multiple rust removal modules may include multiple bullet-carried rust removal mechanisms 1 moving synchronously. During production, the corresponding number of rust removal modules 10 can be integrated together. There is no need to install individual rust removal modules 10 separately, which is convenient for production and installation. If a rust removal module is damaged during use, it is convenient to disassemble, replace and repair.

Figure 2:
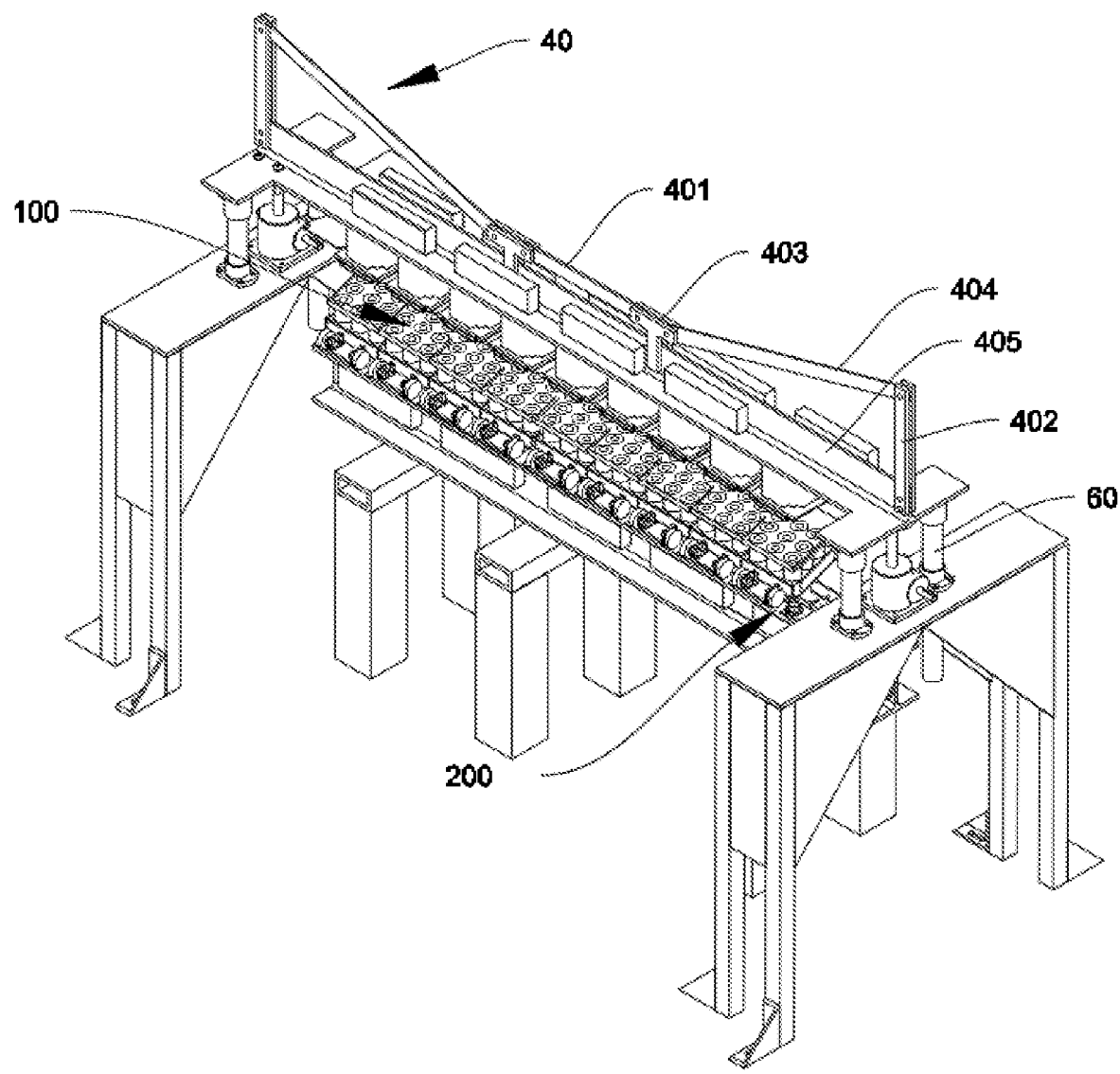
FIG. 2 is a schematic overall structural view of a rust removal device according to another preferred embodiment of the disclosure.

Referring to FIG. 2, in the preferred embodiment, the rust removal device may further include a mounting frame 40, each rust removal module may further include a module frame 20, and the bullet-carried rust removal mechanism 1 is fixed on the module frame 20. The module frame 20 is movably connected with the mounting frame 40, and the module frame 20 can reciprocate along a movement direction of the bullet 12 relative to the mounting frame 40. When in use, adjust the module frame 20 according to a thickness of the material 800 to thereby make a distance between the rust removal module and the material 800 appropriate.

Referring to FIG. 3, in a preferred embodiment, each rust removal module may further include a positioning part 30, the positioning part 30 is fixed on the module frame 20, and adjusting springs are arranged between the module frame 20 and the mounting frame 40.

In a preferred embodiment, the positioning part 30 includes a positioning roller 301, and the positioning roller 301 is arranged on a feeding side of the rust removal module. During operation, the positioning roller 301 presses the object to be derusted, and when the bullet 12 reciprocates to the highest point, there is a certain distance between the bullet 12 and the object to be derusted.

Referring to FIG. 2, in a preferred embodiment, the mounting frame 40 includes a suspension beam 401, at least two support columns 402, a connecting column 403 and a pull rod 404. At least two support columns 402 are fixedly connected with the suspension beam 401 and extend upward relative to the suspension beam 401. The connecting column 403 is connected with the suspension beam 401 and located between the two support columns 402. A first end of the pull rod 404 is connected with the support column 402, a second end is connected with the connecting column 403, and the first end of the pull rod 404 is higher than the second end. Since most parts of the whole rust removal device are assembled in a middle of the mounting frame 40, a gravity is too large, especially when there are many rust removal modules 10, a gravity of the rust removal module itself, a gravity of the material 800 during operation and a force exerted by a power device may be difficult to bear for the ordinary mounting frame 40. The mounting frame 40 adopted by the disclosure can skillfully transfer the stress of the middle part to both sides, a burden of the middle part can be reduced and the overall structure can be more stable.

Figure 1:
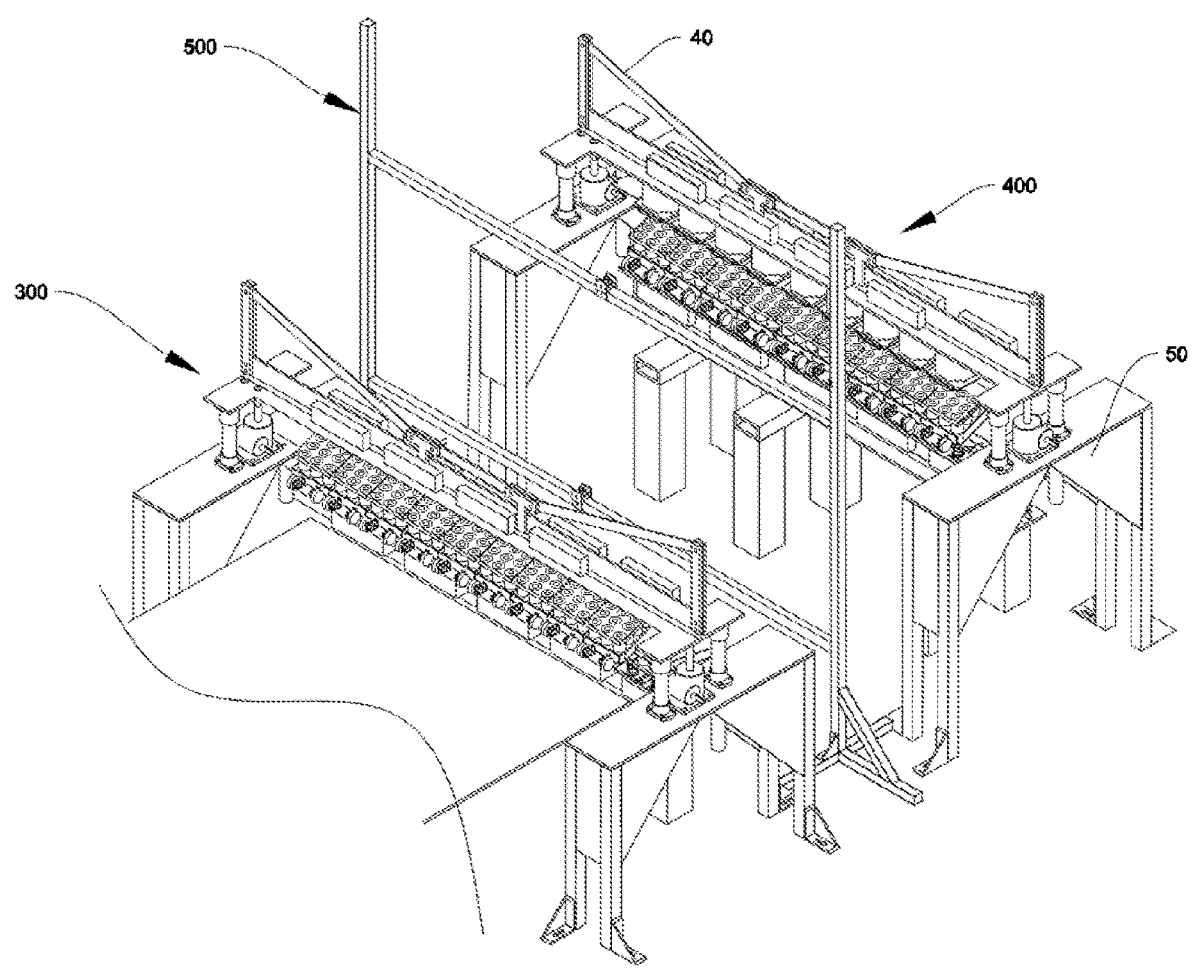
FIG. 1 is a schematic overall structural view of a rust removal device according to a preferred embodiment of the disclosure.

Referring to FIG. 1 and FIG. 2, in a further preferred embodiment, the mounting frame 40 includes a suspension beam 401, two support columns 402, two connecting columns 403, two pull rods 404 and a connecting rod 405. The two support columns 402 are respectively fixed at both ends of the suspension beam 401. The two connecting columns 403 are fixed on the suspension beam 401 and located between the two support columns 402, and the two connecting columns 403 are arranged at intervals. The two ends of the two pull rods 404 are respectively connected with the corresponding connecting column 403 and the support column 402. Two ends of the connecting rod 405 are respectively connected with the two connecting columns 403. The setting of the connecting rod 405 makes the integrity of the mounting frame 40 higher and the structure stronger.

In another preferred embodiment, the rust removal device further includes a mounting frame 40 and a support frame 50, multiple bullet-carried rust removal mechanisms 1 are installed on the mounting frame 40, and the mounting frame 40 is installed on the support frame 50. Both ends of the mounting frame 40 are connected to the support frame 50 to transfer a gravity of the rust removal module itself, a gravity of the material 800 during operation and a force exerted by a power device to the support frame 50. A lifting assembly 60 is arranged between the mounting frame 40 and the support frame 50, and the lifting assembly 60 is used to drive the mounting frame 40 to lift relative to the support frame 50. The lifting assembly 60 can make the mounting frame 40 drive the components installed on its upper part to move upwards and downwards, so as to adjust a height of the rust removal module so that it can be applied in different scenes. The rust removal device can also be used for removing rust of materials 800 with different thickness.

Referring to FIG. 3, in a preferred embodiment, the rust removal device includes a first rust removal array 100 and a second rust removal array 200, and a feeding channel is formed between the first rust removal array 100 and the second rust removal array 200. The first rust removal array 100 and the second rust removal array 200 respectively include multiple bullet-carried rust removal mechanisms 1 arranged side by side. An orientation of the bullets of the first rust removal array and an orientation of the bullets of the second rust removal array are opposite. The material 800 passes through the feeding channel. The first rust removal array 100 and the second rust removal array 200 knock on different surfaces of the material 800 respectively, so as to realize simultaneous double-sided rust removal, which is more efficient. In the feeding direction of the rust removal device, the first rust removal array 100 and the second rust removal array 200 are arranged in face-to-face manner or in a staggered manner, preferably in a staggered manner. The bullet 12 of the disclosure knocks the material 800 and generates a vibration of small area and large amplitude, and thereby removing the rust on surface of the material 800. If a setting manner of face-to-face is adopted, two sides of the material 800 are stressed at the same time, which is bound to cause a part of the force to be offset, and the rust removal effect is relatively poor. A staggered setting manner can just avoid the problem and realize the effect of double-sided rust removal.

Referring to FIG. 1, in a preferred embodiment, the rust removal device includes a front rust removal array 300 and a rear rust removal array 400. The front rust removal array 300 and the rear rust removal array 400 are spaced from each other along a feeding direction of the rust removal device. The rear rust removal array 400 is arranged on a feeding-out side of the front rust removal array 300, and a rust detection device 500 is arranged between the front rust removal array 300 and the rear rust removal array 400. The rust detection device 500 detects the material 800 from the front rust removal array 300. If rust is still detected in some parts of the material 800, the rear rust removal array 400 will knock again according to the detection results, and the bullet 12 on the rear rust removal array 400 selectively selects a position with rust to knock. It can not only ensure the effect of rust removal, but also avoid a problem of excessive roughness of materials 800 caused by excessive rust removal. In a preferred embodiment, the rust detection device 500 may include a detection frame and a camera installed on the detection frame. The camera is connected with a controller of the rust removal device, the surface of the material 800 is photographed by the camera, and the rust is detected by an image recognition. In the embodiment, the detection support is provided with upper and lower rows of cameras for photographing and detecting rust of an upper surface and a lower surface of the material 800 respectively. In other embodiments, the rust detection device 500 may also detect rust by ultrasonic.

In a preferred embodiment, the rear rust removal array 400 may include multiple rust removal modules 10 moving independently of each other, each of the multiple rust removal modules may include multiple bullet-carried rust removal mechanisms 1 moving synchronously, and the rust removal device may further include a mounting frame 40. Each of the multiple rust removal module may further include a module frame 20. The bullet-carried rust removal mechanism 1 is fixed on the module frame 20, a lifting driving device is arranged between the module frame 20 and the mounting frame 40, and the lifting driving device is configured to drive the module frame 20 to reciprocate along a moving direction of the bullet 12 relative to the mounting frame 40. Specifically, a structure of the rear rust removal array 400 is the same as a structure of the front rust removal array 300. Since a function of the rear rust removal array 400 is to supplement rust removal and remove the rust that has not been completely removed by the front rust removal array 300, its workload is relatively small, and the rear rust removal array 400 can also be set according to actual situations.

Figure 15:
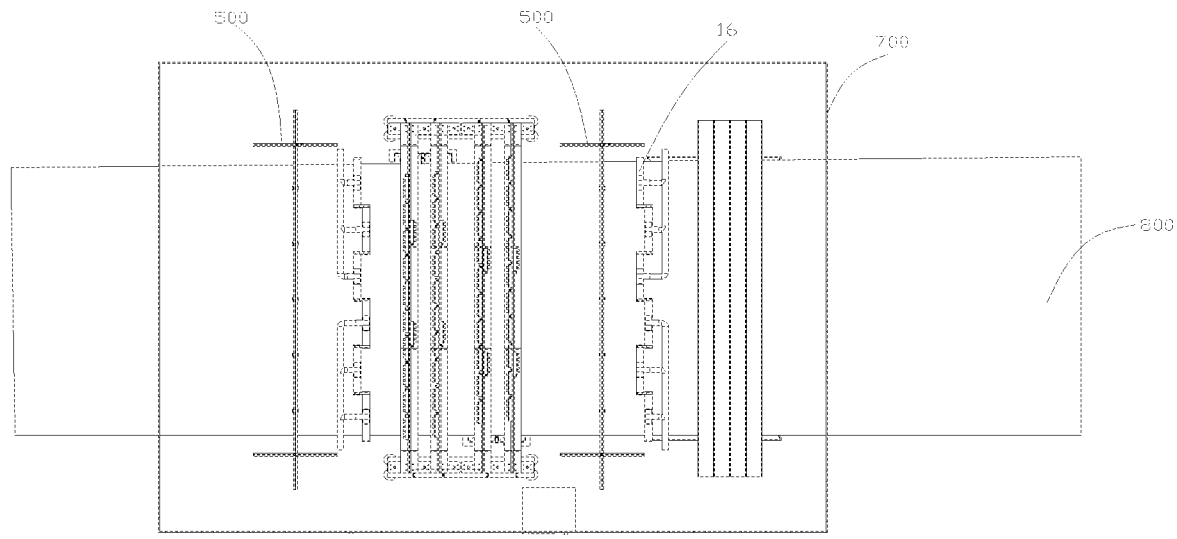
FIG. 15 is a schematic cross-sectional view of the rust removal system according to a preferred embodiment of the disclosure.

Referring to FIG. 15, in a preferred embodiment, a feeding-out side of the rear rust removal array 400 is provided with a rust detection device 500, which can detect a rust removal qualification of products with a high rust removal quality requirement.

Referring to FIG. 3, in a preferred embodiment, at least some of the bullet-carried rust removal mechanisms 1 are distributed in multiple rows and multiple columns, and in a direction perpendicular to a feeding direction of a rust removal device. Centers of the knocking portions 1200 of at least some of the bullet-carried rust removal mechanisms 1 in different rows are arranged in a staggered manner, that is, projections of the multiple bullets 12 in the feeding direction perpendicular to the rust removal device are different. After the material passes through a rust removal stage, the points knocked by bullet 12 on a rust removal plate are connected into flakes, and the rust removal effect is better.

Referring to FIG. 3, in a preferred embodiment, on a knocking surface of the rust removal device, centers of at least some of the knocking portions 1200 of the bullet-carried rust removal mechanism 1 are distributed in a parallel quadrilateral point array, and a connecting line of the centers of the knocking portions 1200 in the same column of the bullet-carried rust removal mechanism 1 is oblique relative to a feeding direction of a rust removal device. Adjacent bullets 12 are arranged in a staggered manner to thereby avoid leaving a blind area that cannot be knocked on a plate to be derusted.

In a preferred embodiment, at least some of the bullet-carried rust removal mechanisms 1 are arranged to form a knocking area, and a dust-proof curtain (not shown in the drawings) is arranged on a feeding-in side and/or a feeding-out side of the knocking area. A lower end of the dust-proof curtain is in contact with a plate to be derusted. During knocking and removing rust, a large amount of dust will float into the air. The dust-proof curtain separates the dust inside the dust-proof curtain to reduce a pollution to the air outside the dust-proof curtain. Further, the dust-proof curtain is a hard curtain, and a soft edge is arranged at a lower part of the dust-proof curtain, and the edge is in contact with a rust body to be removed, which can collect broken slag. Specifically, the soft edge is made of brush or polymer soft materials.

In a preferred embodiment, a feeding-out side of the bullet-carried rust removal mechanism 1 is provided with a waste collection device for removing the broken slag removed by knocking.

Referring to FIG. 15, in a preferred embodiment, the bullet-carried rust removal mechanism base 11 further includes a dust absorbing pipe 16, and an opening of the dust absorbing pipe 16 is arranged close to the knocking portions 1200 for removing the broken slag removed by knocking.

Figure 16:
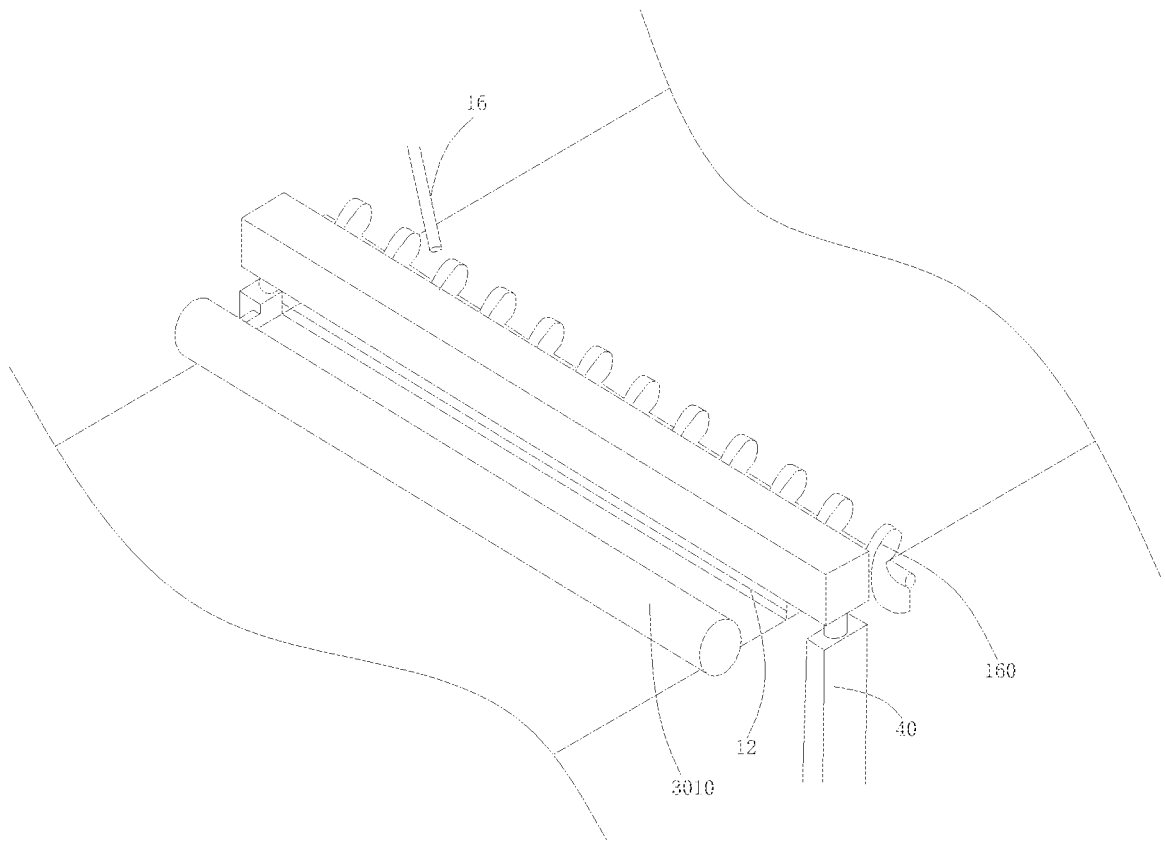
FIG. 16 is another schematic overall structural view of the rust removal system according to a preferred embodiment of the disclosure.

Referring to FIG. 16, in a preferred embodiment, a feeding-out side of a bullet-carried rust removal mechanism 1 is provided with a spiral waste collection brush 160 and a dust absorbing device, a central axis of the waste collection brush 160 is arranged along a lengthwise direction of the bullet-carried rust removal mechanism, and a dust absorbing opening of the dust absorbing device is arranged close to an end of the waste collection brush 160. Specifically, the waste collection brush 160 is connected with a power mechanism, and the power mechanism drives the waste collection brush 160 to rotate. The spiral waste collection brush 160 can collect the broken slag on the plate to be derusted to a side of the plate. The dust absorbing device is used for removing dust to reduce air pollution, and the waste can also be collected into a waste cylinder.

Referring to FIG. 15, in a preferred embodiment, the rust removal module includes a pre-knocking module and a post-knocking module. The rust removal device includes a front rust removal array 300 and a rear rust removal array 400. The pre-knocking module is installed on the front rust removal array 300 and the post-knocking module is installed on the rear rust removal array 400. The bullet-carried rust removal mechanisms 1 of the pre-knocking module are arranged in a staggered manner to form a parallelogram array, and the bullet-carried rust removal mechanisms 1 of the post-knocking module form a square array. The module frame 20 of the pre-knocking module is provided with a telescopic device 203, an end of the telescopic device 203 is fixed on the module frame 20, and the other end is fixed on the mounting frame 40. According to a result of a rust detection device 500, the corresponding telescopic device 203 is controlled to extend or shorten. When the rust detection device 500 detects that the rust at a certain position is unqualified, the corresponding telescopic device 203 extends, and the rust removal module 1 corresponding to the telescopic device 203 can contact with the material 800 to remove the rust of the material 800. The module frame 20 of the post-knocking module may include a first housing 201 and a second housing 202. The post-knocking module is located in a space composed of the first housing 201 and the second housing 202.

Figure 14:
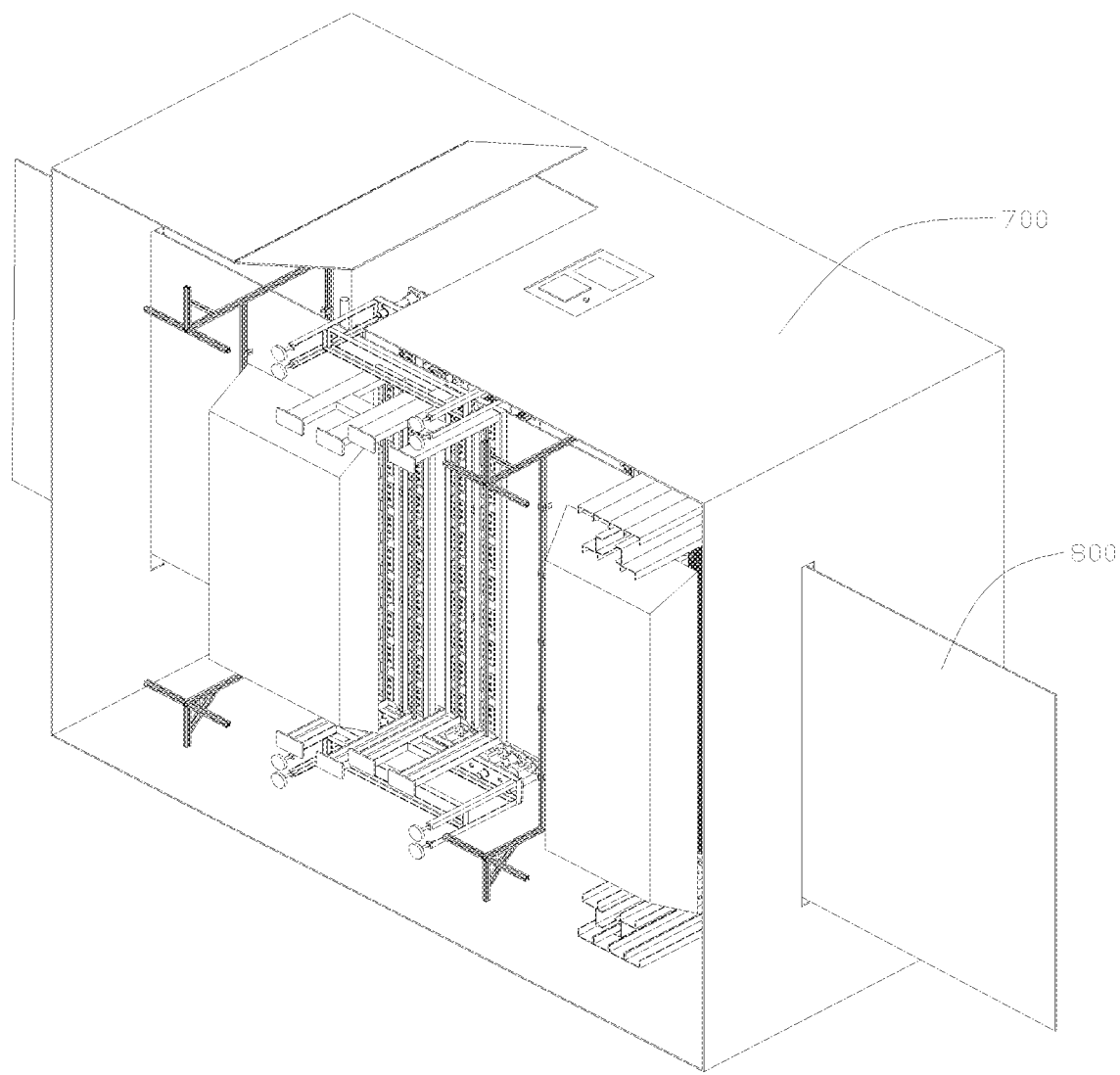
FIG. 14 is a schematic bottom view of a rust removal system according to a preferred embodiment of the disclosure.

Referring to FIG. 14 and FIG. 15, a rust removal system is further provided by the disclosure, including a material conveying device and any one of the above-mentioned rust removal devices. The rust removal device is arranged on the material conveying device or on a side of the material conveying device, and the knocking portions 1200 of the bullets 12 face a feeding surface of the material conveying device. The material conveying device is a conveying belt, a conveying roller, a conveying chain, etc.

In a preferred embodiment, the rust removal system further includes a sound insulation hood, and the sound insulation hood is hooded outside the bullet-carried rust removal mechanism. In another preferred embodiment, the rust removal system further includes a sound insulation hood 700, the sound insulation hood 700 is hooded outside the rust removal device, and the material conveying device passes through the sound insulation hood 700. Compared with the existing marble type rust removal device, the rust removal device of the disclosure has a low decibel of noise generated in a rust removal process and a small propagation distance. The sound insulation hood 700 can provide a good sound insulation and reduce noise pollution.

Referring to FIG. 24 through FIG. 29, in a preferred embodiment, the mounting frame includes a rail robot, the bullet-carried rust removal mechanism is installed on the rail robot, and the rail robot is configured to drive the bullet-carried rust removal mechanism to move.

The rail robot includes an anchoring mechanism, a first driving mechanism 1-3 and a rail assembly, and the rail assembly includes a first rail 1-1 and second rails 1-2. The rail robot can move along a parent rail driven by the first driving mechanism 1-3, and can fix itself relative to the parent rail through the anchoring mechanism when the rail robot moves near a point to be constructed. It should be noted that the parent rail in the scheme is not limited to a linear rail, because it is easy for those skilled in the related art to think of a variety of anchoring mechanisms 1-6, which can fix the rail robot relative to the parent rail in a curve or ramp. The rail robot may further include a roller. Further, the roller is a universal wheel, which can be clamped on the parent rail and roll along the parent rail, which is convenient for the rail robot to turn on the parent rail.

The anchoring mechanism includes a vacuumizing mechanism and a flexible plate. The flexible plate includes an adsorption end face facing a side wall of the parent rail. The adsorption end face includes concave parts, and the vacuumizing mechanism is connected with the concave parts. When there is a pressure difference between the concave part and atmospheric pressure, the flexible plate can be bent under an action of atmospheric pressure to make the adsorption end face arc-shaped. The concave parts are grooves, the grooves are several parallel grooves. Even if the side wall of the parent rail is not completely flat but has a certain radian or uneven, after the flexible plate is attached to the side wall of the parent rail, the concave part of the flexible plate is vacuumized and bent under the action of atmospheric pressure, and thereby adhering to the side wall of the parent rail and enhancing the adsorption and anchoring effect.

In the embodiment, a construction robot is used to remove rust from a object to be derusted. The construction robot includes a second driving mechanism, a bullet-carried rust removal mechanism and a positioning mechanism. The bullet-carried rust removal mechanism can move along the rail assembly driven by the second driving mechanism, and the bullet-carried rust removal mechanism can be relatively fixed with gear racks on the rail assembly through the positioning mechanism when the bullet-carried rust removal mechanism is transported to an accurate point to be constructed, so as to relatively fixed with the rail robot. Therefore, the bullet-carried rust removal mechanism can perform construction on a structure to be constructed. The bullet-carried rust removal mechanism can complete a displacement in a horizontal direction and/or a height direction along the rail assembly under the drive of the second driving mechanism (when the first rail is placed vertically), and thereby realizing an effect of fine-tuning a position of the bullet-carried rust removal mechanism and make the bullet-carried rust removal mechanism accurately reach the point to be constructed.

Figure 24:
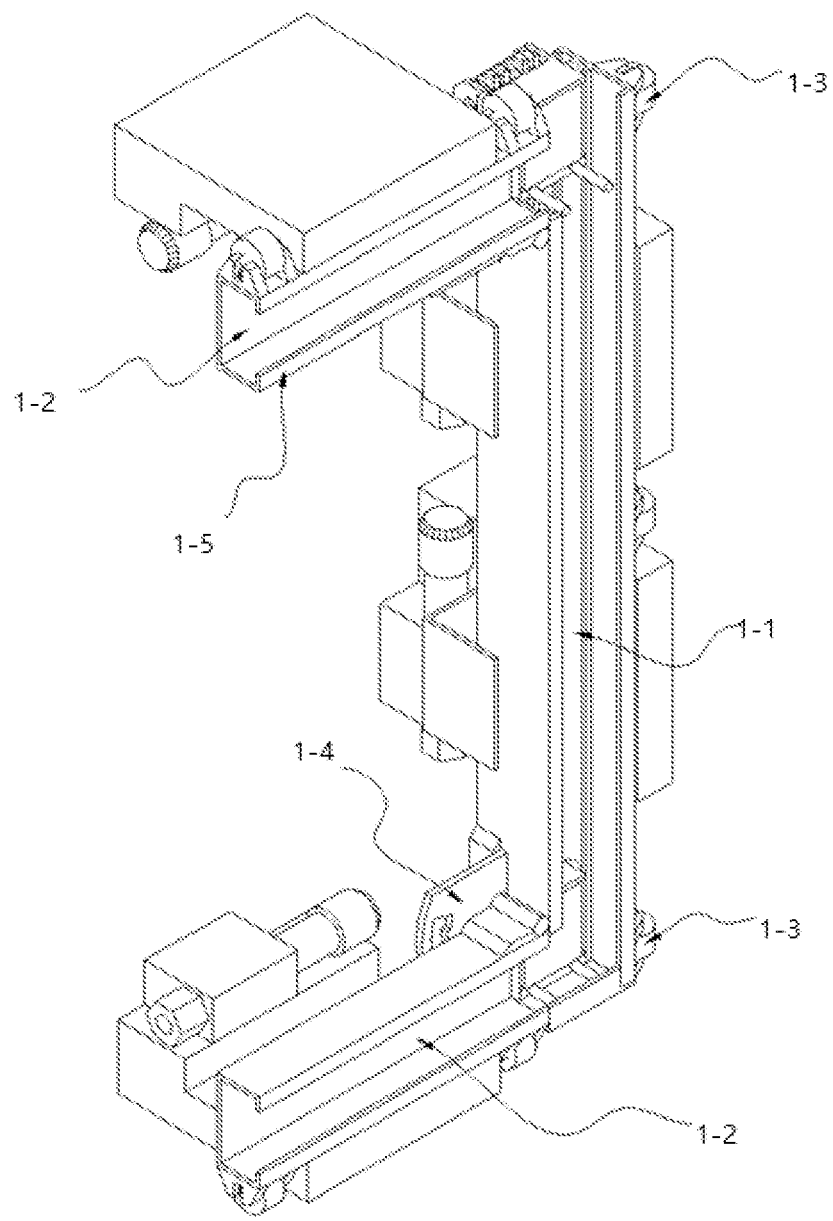
FIGS. 24-25 are schematic structural views of two states of a rust removal device according to another embodiment of the disclosure.
Figure 25:
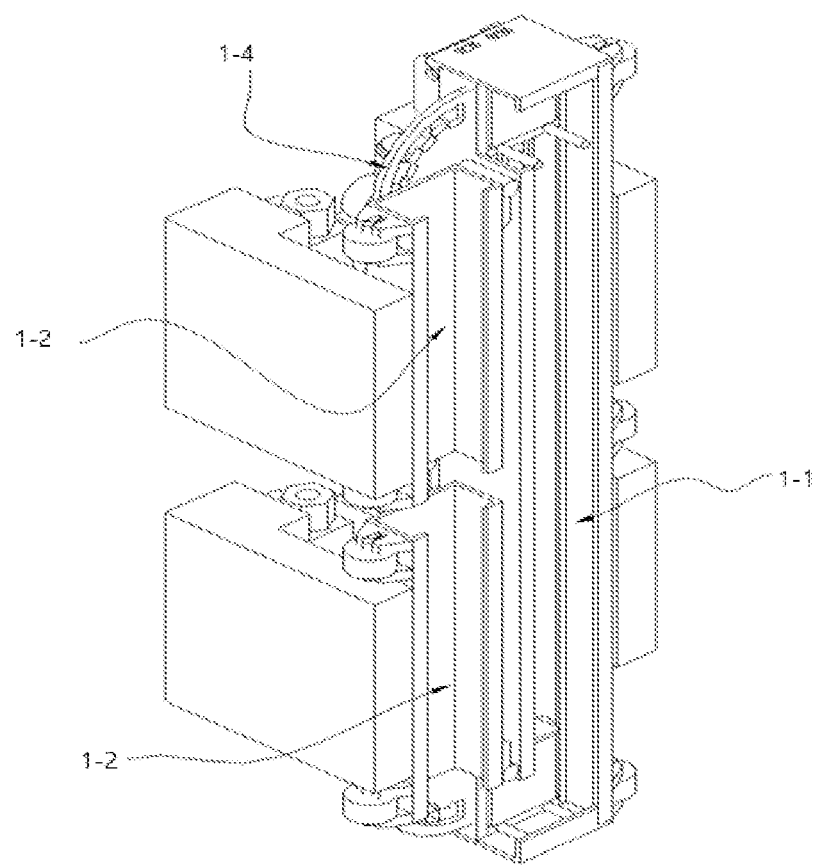
Figure 26:
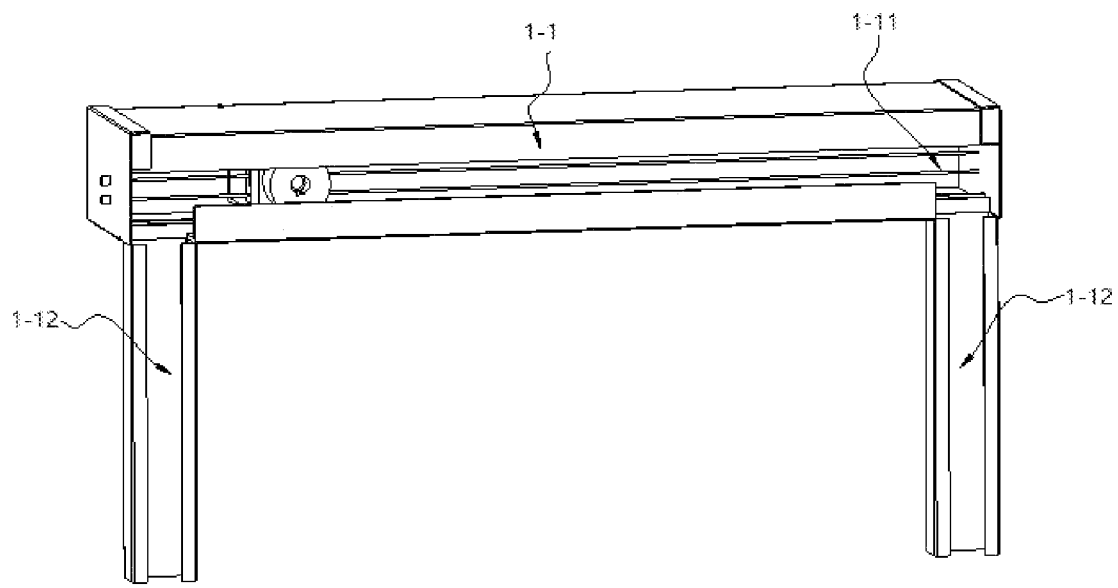
FIG. 26 is a schematic overall structural view of a rail assembly according to another embodiment of the disclosure.
Figure 27:
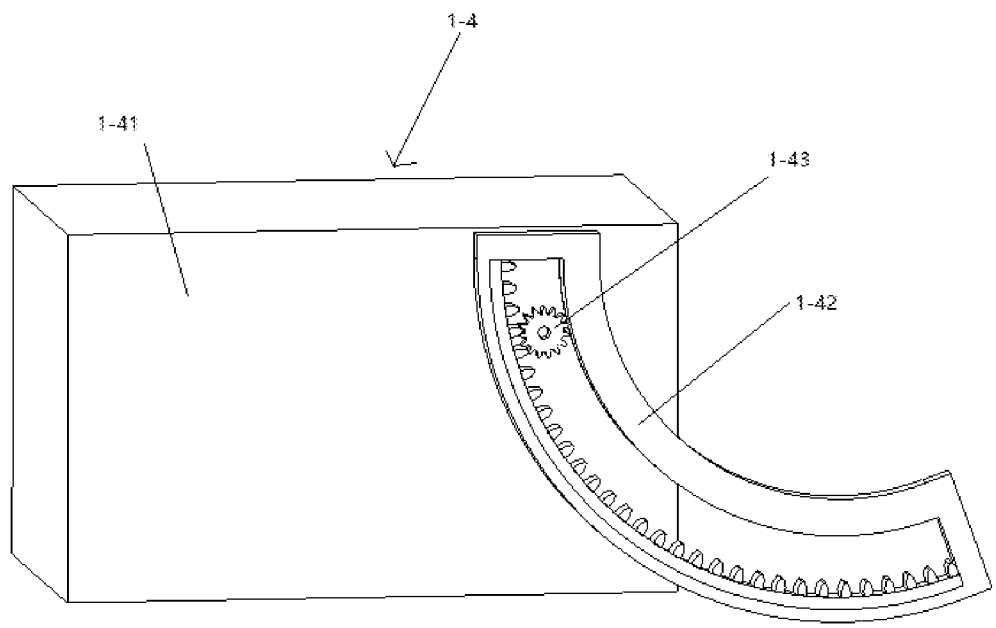
FIG. 27 is a schematic overall structural view of a joint assembly according to another embodiment of the disclosure.
Figure 28:
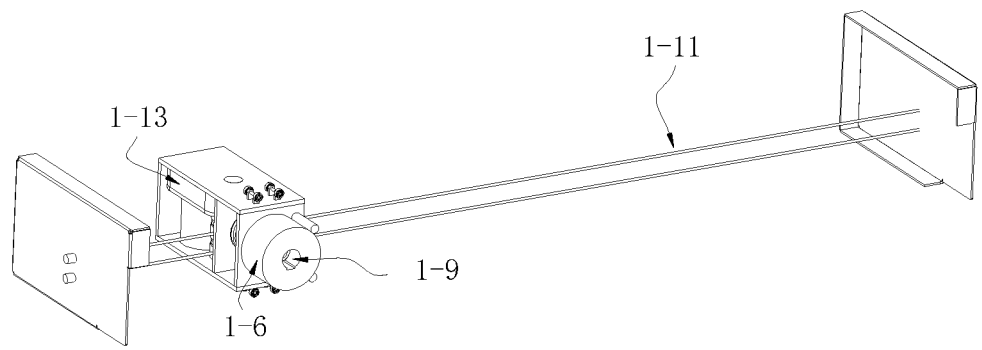
FIG. 28 is a schematic internal structural view of a first rail according to another embodiment of the disclosure.
Figure 29:
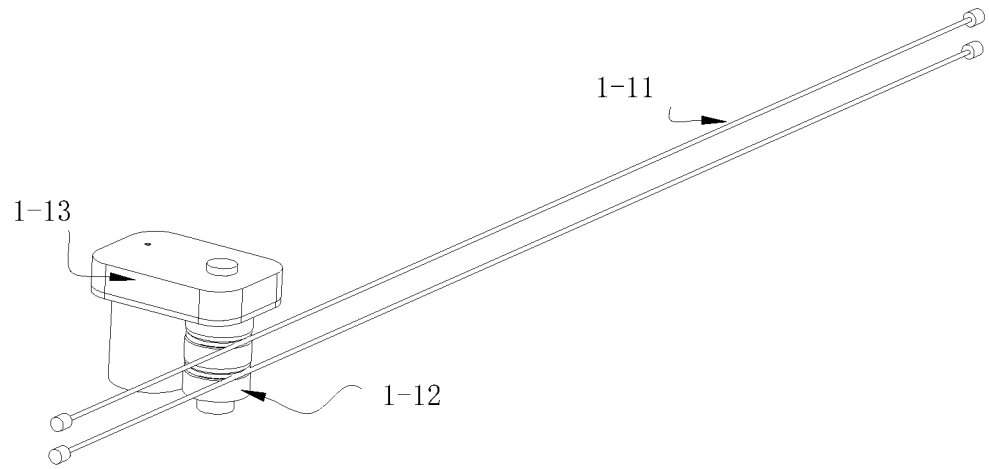
FIG. 29 is schematic views of showing a connection relationship between flexible tension wires and a sliding table of an embodiment of the disclosure.

Referring to FIG. 24 and FIG. 27, an end of the first rail 1-1 is provided with a rotating joint assembly 1-4. The second rail 1-2 is rotatably installed at one or two ends of the first rail 1-1 through the rotating joint assembly 1-4, the second rail 1-2 can rotate relative to the first rail 1-1 under a driving of the third driving mechanism 1-41, and a rotation angle range is 0 to 90 degrees. Specifically, the rotating joint assembly 1-4 includes a third driving mechanism 1-41, an arc-shaped gear rack 1-42 and a gear 1-43. The arc-shaped gear rack 1-42 and the gear 1-43 are fixed on the first rail 1-1 and the second rail 1-2 respectively. As shown in FIG. 24, when two second rails 1-2 are far away from the first rail 1-1 and the two second rails 1-2 close together, it is defined as 0 degrees (a total length of the two second rails 1-2 is not larger than a length of the first rail 1-1). As shown in FIG. 25, when the two second rail 1-2 are perpendicular to the first rail 1-1, it is defined as 90 degrees. The first rail 1-1 lies on a bottom wall of the parent rail, and a lengthwise direction of the first rail 1-1 is a widthwise direction of the parent rail. Moreover, the length of the first rail 1-1 can be set to be the same as the width of the parent rail, and the widths of all parts of the parent rail are equal. In this way, when the second rail 1-2 is at 90 degrees, the rail robot is just embedded in the parent rail, which is more convenient for the parent rail to guide the rail robot. It should be noted that the second rails 1-2 are detachably installed on the rotating joint assembly 1-4, which is equivalent to a detachable connection between the second rail 1-2 and the first rail 1-1, so as to facilitate modular installation. According to the needs of the project, select the first rail 1-1 with an appropriate length, and then install the second rail 1-2 with an appropriate length at one or both ends of the first rail 1-1 according to the actual needs. The rotating joint assembly 1-4 can be locked, and in a non-locked state, the second rails 1-2 can swing relative to the first rail 1-1. In a locked state, the second rails 1-2 are relatively fixed with the first rail 1-1, so that the bullet-carried rust removal mechanism can move on the second rail 1-2s.

Referring to FIG. 26 through FIG. 30, in a preferred embodiment, the first rail 1-1 includes flexible tension wires 1-11. A sliding table includes a pulley 1-12, a fourth driving mechanism 1-13 and a limit hole. The flexible tension wires 1-11 are non-slidably wound on the pulley 1-12 and pass through the limit hole. When the fourth driving mechanism 1-13 drives pulley 1-12 to rotate, the pulley 1-12 can operatively move along flexible tension wires 1-11 to thereby drive the sliding table up and down. When the fourth driving mechanism 1-13 does not drive the pulley 1-12 to rotate, the pulley 1-12 is stationary relative to the flexible tension wires 1-11, the flexible tension wires 1-11 hovers the pulley 1-12. A function of the limit hole is to prevent the sliding table from shaking left and right to a certain extent. The second rail 1-2 is an opening slot, and an end of a slot wall of the opening slot away from a slot bottom thereof extends inward to form a baffle. The baffle can be used to guide the sliding table to prevent pulley 1-12 from falling off the rail. The solution solves a problem that object is easy to slide down after braking on a large slope or even a vertical moving surface.

The flexible tension wires 1-11 include a locking-releasing stage. The bullet-carried rust removal mechanism further includes a travel mechanism, and the bullet-carried rust removal mechanism can move along the second rail 1-2 through its own travel mechanism. The bullet-carried rust removal mechanism moves along the second rail 1-2 to a pausing stage 1-8 at an end of the first rail 1-1. A side of the pausing stage 1-8 is the upper locking-releasing stage, the sliding table is located in the upper locking-releasing stage. A locking mechanism of the bullet-carried rust removal mechanism locks wheel of the bullet-carried rust removal mechanism on pin hole 1-9 on a side of the sliding table. Then, the fourth driving mechanism 1-13 drives the pulley 1-12 to rotate and the sliding table descends. During this period, the locking mechanism always locks the bullet-carried rust removal mechanism on the sliding table until the sliding table descends to the lower locking release stage, and the locking mechanism releases the bullet-carried rust removal mechanism. A side of the lower locking release stage is the pausing stage 1-8 of another second rail 1-2. The bullet-carried rust removal mechanism loosened by the locking mechanism is released to the pausing stage 1-8, so that the bullet-carried rust removal mechanism can move on the lower second rail 1-2 through the wheel 1-6. The first rail 1-2 and the second rail 1-2 form a rail assembly, and a rust removal robot can move on the rail assembly, so that a whole surface to be derusted can be removed. Preferably, the two second rails 1-2 are located in a same plane. The above technical solution solves a problem that the bullet-carried rust removal mechanism cannot turn. The solution also solves a problem that the rust removal robot can only remove the rust of a rust structure to be removed parallel to the flexible tension wire 1-11. Without the structure, the rust removal robot cannot remove rust of a complete surface to be derusted, unless many flexible tension wires 1-11 and rust removal robots are set.

Further, the first rail 1-1 and the second rail 1-2 are rotatably connected, and a lockable positioning mechanism is arranged between the first rail 1-1 and the second rail 1-2. The positioning mechanism can be locked after the second rail 1-2 rotates relative to the first rail 1-1, so that the second rail 1-2 is relatively fixed to the first rail 1-1. The second rail 1-2 can rotate on the above rail assembly, which is convenient to adjust a position of the rust removal robot for removing rust of the surface to be derusted.

The locking mechanism of the bullet-carried rust removal mechanism includes a magnetic pin and an energizing coil. The magnetic pin can be movably embedded in the energizing coil, and a forward or reverse current is respectively applied to the energizing coil to thereby drive the magnetic pin to insert/withdraw from the pin hole 1-9 to lock or loosen the object.

Further, a line tank is arranged on the pulley 1-12, and the flexible tension wires 1-11 are wound on the line tank. The fourth driving mechanism 1-13 includes a reduction gearbox.

Further, the second rail includes an opening slot, and a notch of the opening slot is provided with a baffle extending inward.

Figure 30:
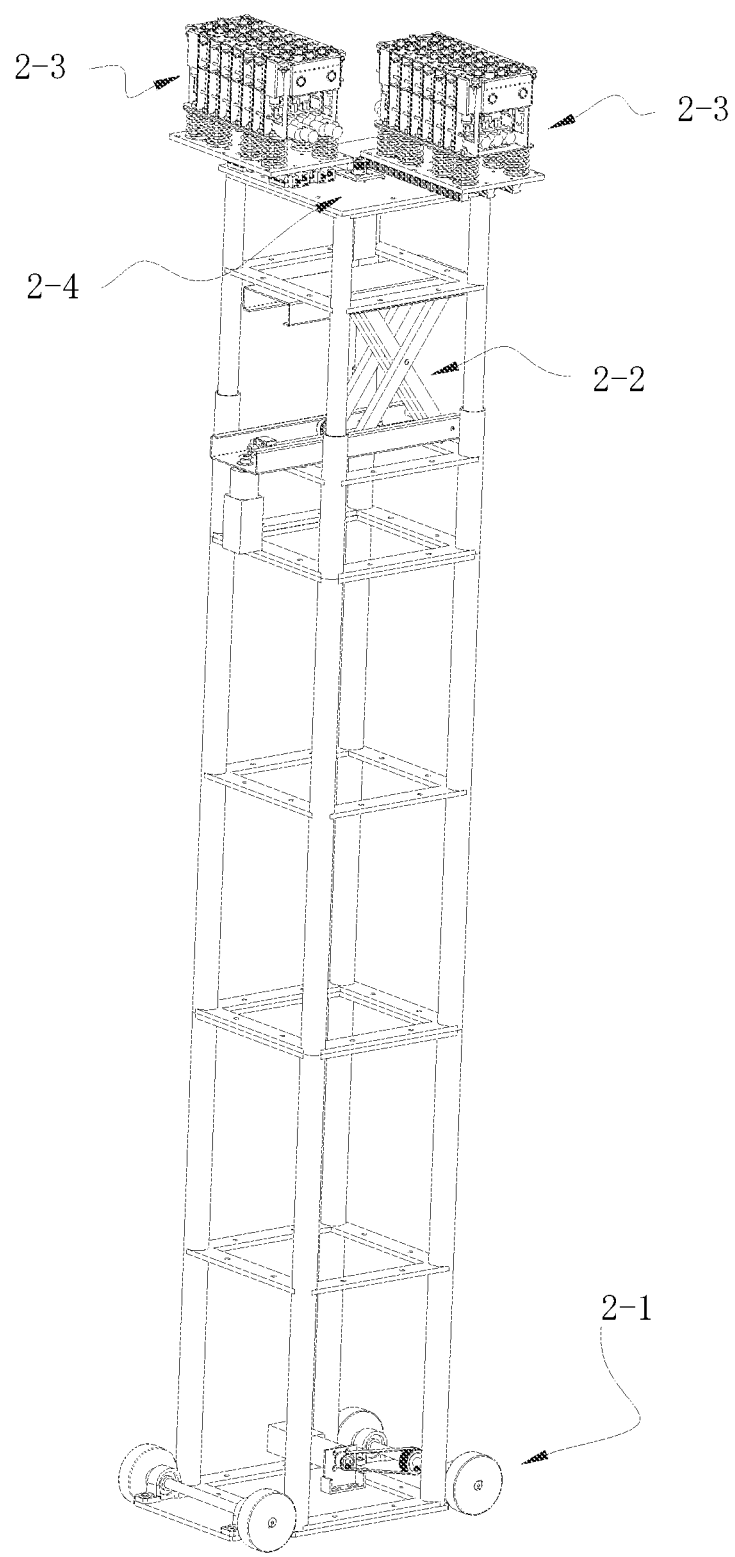
FIG. 30 is a schematic overall structural view of a rust removal device according to still another embodiment of the disclosure.
Figure 31:
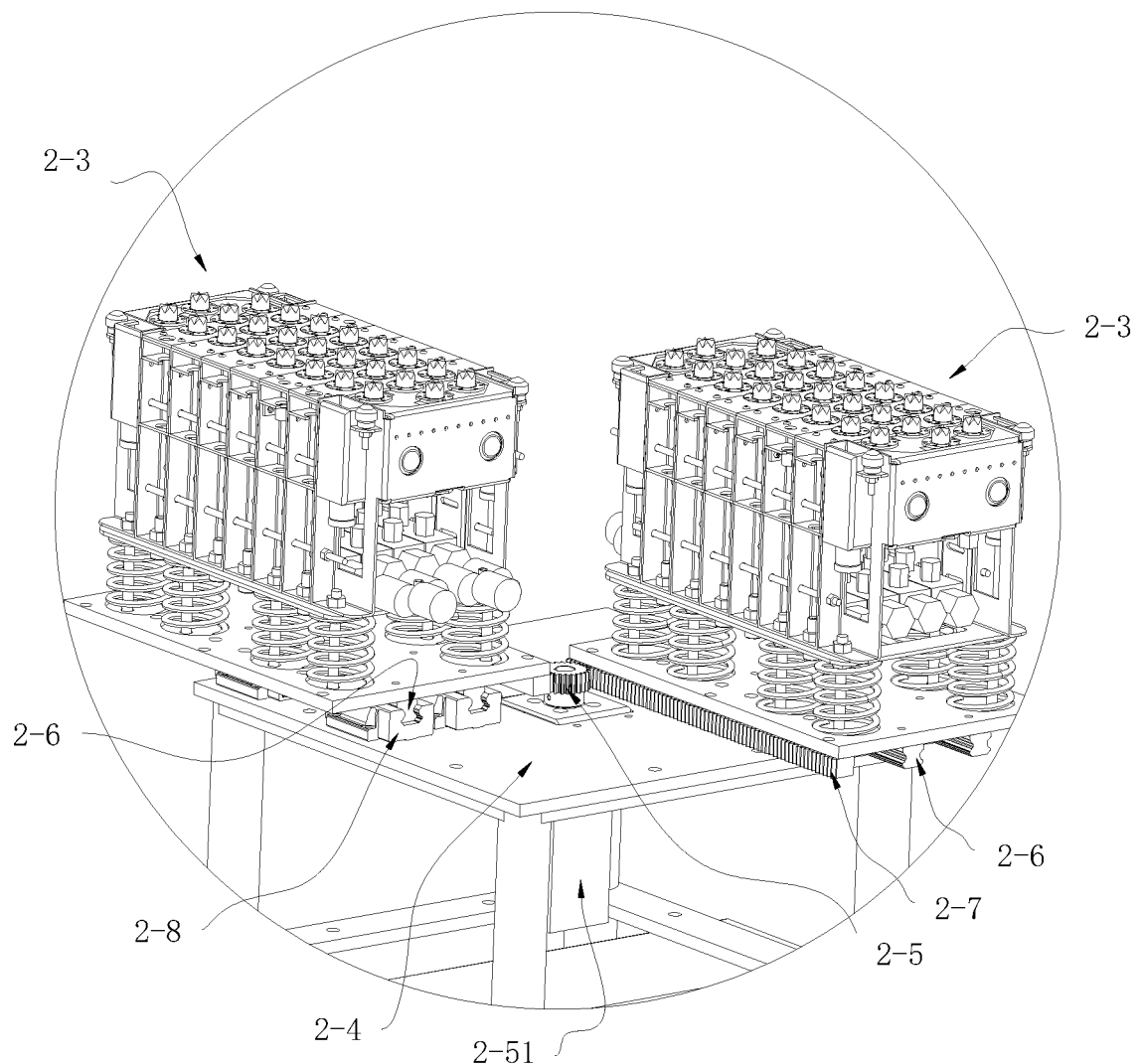
FIG. 31 is a schematic partial enlarged view of FIG. 30.
Figure 32:
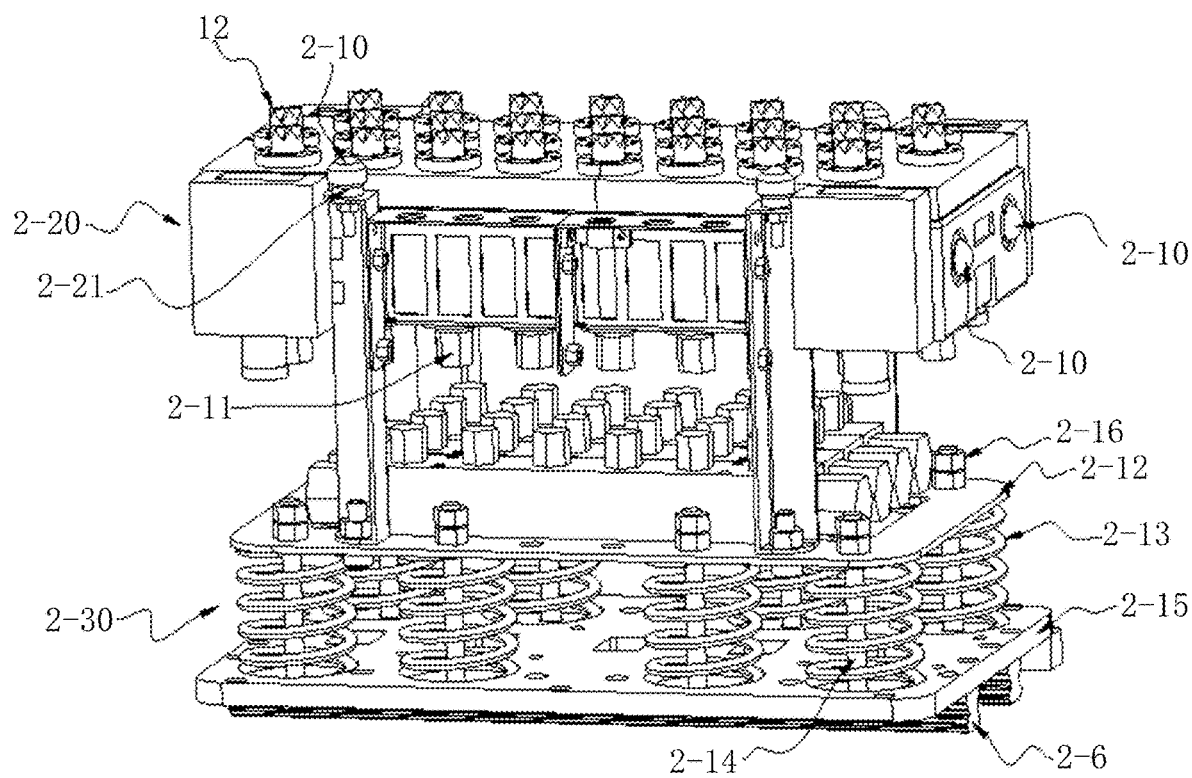
FIG. 32 is a schematic overall structural view of a bullet-carried rust removal mechanism according to an embodiment of the disclosure.

Referring to FIG. 30-32, in a preferred embodiment, the mounting frame includes a lifting mechanism 2-2. The lifting mechanism 2-2 is provided with an elastic component, an end of the elastic component is fixed on the lifting mechanism 2-2, and the other end is connected with the bullet rust removal device. When the lifting mechanism drives the bullet-carried rust removal mechanism to move to the surface to be derusted, a counteracting force of the surface to be derusted to the bullet-carried rust removal mechanism causes the elastic component to contract.

The rust removal device includes a moving mechanism 2-1, a lifting mechanism 2-2 and a bullet-carried rust removal mechanism. The moving mechanism 2-1 drives the rust removal device to move on a plane. The lifting mechanism 2-2 is fixedly installed on an upper part of the moving mechanism 2-1, which can move forward on the ground. An upper end of the lifting mechanism 2-2 is provided with a mounting panel 2-4, and two groups of bullet-carried rust removal mechanisms are arranged and installed on the mounting panel 2-4 above the lifting mechanism 2-2. An installation mode of two groups of bullet-carried rust removal mechanisms 2-3 and the mounting panel 2-4 is shown in FIG. 30. The mounting panel 2-4 is vertically provided with a motor 2-51, and an output gear 2-5 of the motor 2-51 lies horizontally. The mounting panel 2-4 is respectively fixedly provided with chutes 2-8 on both sides of the output gear 2-5, the two chutes 2-8 are respectively directly or indirectly connected with the two groups of bullet-carried rust removal mechanisms. Bottoms of the two groups of bullet-carried rust removal mechanisms are respectively fixedly provided with sliders 2-6, the sliders 2-6 are installed in the chutes 2-8 respectively, and the sliders 2-6 can move along the chutes 2-8. Inner sides of the two groups of bullet-carried rust removal mechanisms are respectively fixed with gear racks 2-7, and the two gear racks 2-7 are meshed with the output gear 2-5 respectively, so that the output gear 2-5 of the motor 2-51 can drive the two groups of bullet-carried rust removal mechanisms to move in two opposite directions respectively during rotation, so as to make the two groups of rust removal mechanisms 2-3 expand/collapse left and right. As the travel mechanism moves forward, a movement direction of the two groups of bullet-carried rust removal mechanisms 2-3 is perpendicular to a travel direction of the travel mechanism.

As shown in FIG. 32, the bullet-carried rust removal mechanism 2-3 may further include a rust removal panel 2-20 and a self-adaptive mechanism 2-30. Several bullets 12 are arranged on an upper end face of the rust removal panel 2-20 along a lengthwise direction of the rust removal panel 2-20, and the bullets 12 are fixedly installed on the rust removal panel 2-20. Universal rollers 2-10 are respectively arranged on wall surfaces on a left side and a right side of the rust removal panel 2-20. The rust removal panel 2-20 extends upward with blocks 2-21, and a top end of the blocks 2-21 is provided with non-sliding universal balls. The self-adaptive mechanism 2-30 includes a securing part, a floating part and guiding upright bars. Further, the securing part is a fixing bottom plate 2-15 and the floating part is a floating top plate 2-12. A number of guiding upright bars 2-14 are arranged between the fixing bottom plate 2-15 and the floating top plate 2-12, and the fixing bottom plate 2-15 and the floating top plate 2-12 are provided with preformed holes suitable for the size and quantity of the guiding upright bars 2-14. Lower ends of the guiding upright bars 2-14 respectively passe through the preformed holes of the fixing bottom plate 2-15 and are fixedly installed on the fixing bottom plate 2-15. The guiding upright bars 2-14 are sleeved with elastic components respectively, and the elastic components are springs 2-13. Lower ends of the springs 2-13 are fixedly installed on the fixing bottom plate 2-15. Upper ends of the guiding upright bars 2-14 respectively passe through the preformed holes of the floating top plate 2-12, and a bottom of the floating top plate 2-12 is supported by the upper ends of the springs 2-13. When the floating top plate 2-12 is stressed, the floating top plate 2-12 can move along the guiding upright bar 2-14, the upper end of the guiding upright bar 2-14 is provided with a limit end 2-16 so that the floating top plate 2-12 cannot slide off from the guiding upright bar 2-14. The rust removal panel 2-20 is fixedly installed on an upper surface of the floating top plate 2-12, and the slider 2-6 is fixedly installed on a lower surface of the fixing bottom plate 2-15.

The rust removal device of the embodiment can be used for removing rust of cabin, for example, the cabin with four side walls at the front, rear, left and right. The working process is as follows: initially, the two groups of bullet-carried rust removal mechanisms are folded to enter the cabin from a cabin door. After the rust removal device enters the cabin, the rust removal device remains in place, and the lifting mechanism 2-2 lifts the bullet-carried rust removal mechanism. The function of self-adaptive mechanism 2-30 is: if a top wall of the cabin is a little inclined, when some the blocks 2-21 contacts the top wall of the cabin, the other blocks 2-21 do not contact the top wall of the cabin, and the lifting mechanism 2-2 continues to lift the bullet-carried rust removal mechanism. The blocks 2-21 that have contacted the top wall of the cabin are subjected to a counteracting force of the top wall of the cabin to press down the rust removal mechanism 2-3, so that the floating top plate 2-12 compresses the springs 2-13. Therefore, the blocks 2-21 of this part will not rise. The universal balls on the blocks 2-21 is used to prevent the blocks 2-21 from being worn by the top wall of the cabin. The other blocks 2-21 that does not contact the top wall of the cabin is continuously driven up by the lifting mechanism 2-2 until all the blocks 2-21 contact the top wall of the cabin, and operator controls the lifting mechanism 2-2 to stop acting. At this time, the rust removal panel 2-20 is parallel to the top wall of the cabin, and the bullet 12 can remove rust of the top wall of the cabin. A function of the blocks 2-21 is to prevent the bullet 12 from being pressed and worn by the surface to be derusted when the lifting mechanism 2-2 drives the bullet-carried rust removal mechanism to rise, and to leave a space between the surface to be derusted and the rust removal plane for a lifting of the bullet 12. After the lifting mechanism 2-2 lifts the bullet-carried rust removal mechanism to a target position, the operator starts the motor 2-51. The output gear 2-5 of the motor 2-51 drives one bullet-carried rust removal mechanism to move towards a left wall and another bullet-carried rust removal mechanism to move towards a right wall. At the same time, the operator also starts the bullet 12 to remove rust of the top wall of the cabin, until the universal rollers 2-10 on the side walls of the two bullet-carried rust removal mechanisms are against the left wall and the right wall respectively, so as to complete a rust removal of the top wall of the cabin in a first row. Next, the rust removal device travels for a certain distance, which is not larger than a width of the bullet-carried rust removal mechanism in front and rear directions. The universal rollers 2-10 are used to prevent the side wall of the cabin from wearing the side wall of the bullet-carried rust removal mechanism when the bullet rust removal device travels, and then make the bullet-carried rust removal mechanism remove rust of the top wall of the cabin while retracting the bullet-carried rust removal mechanism, so as to complete the rust removal of the top wall of the cabin in the next row. Repeat the above steps until the rust removal of the top wall of the whole cabin is completed.

Figure 33:
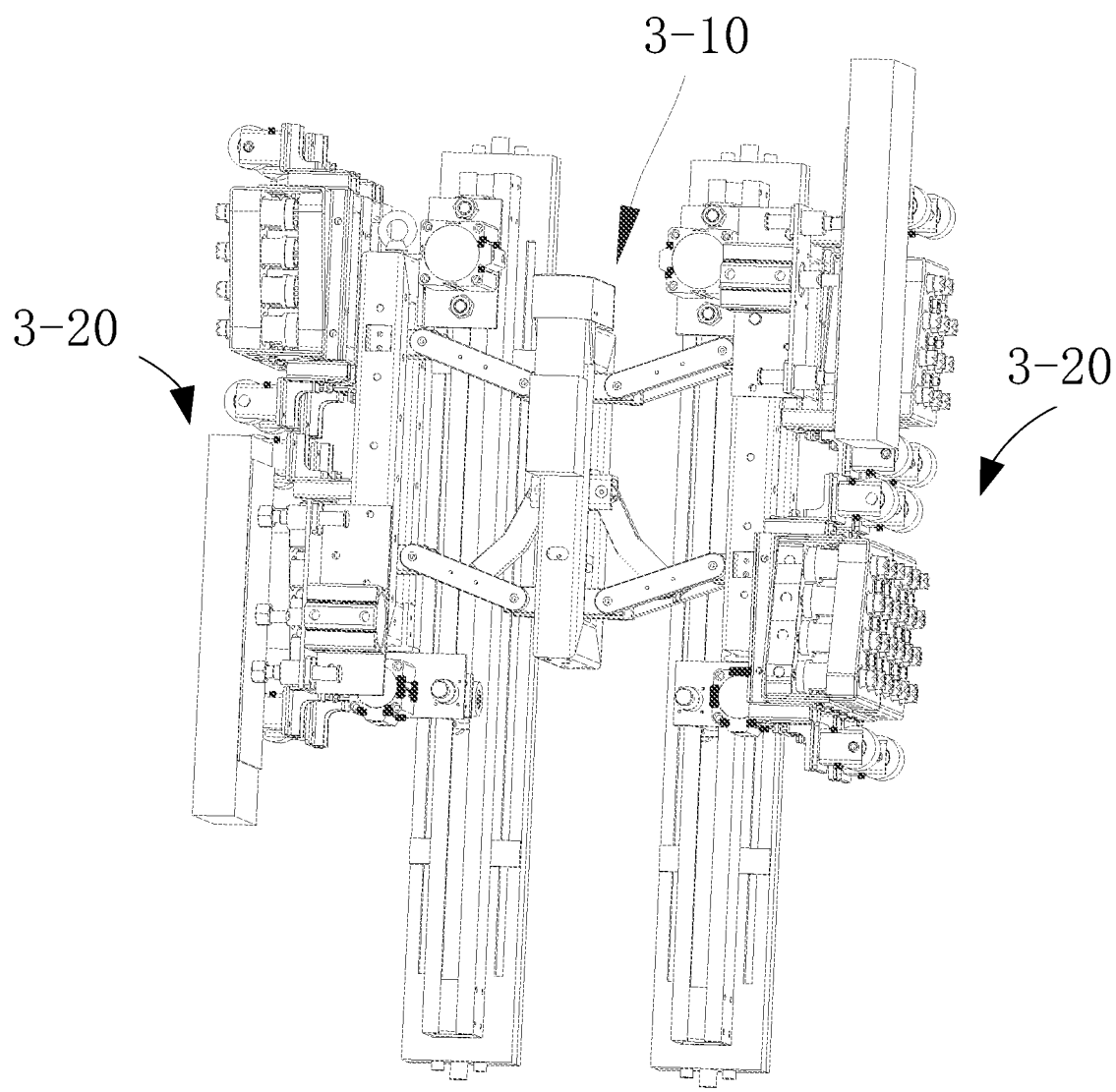
FIG. 33 is a schematic overall structural view of a rust removal mechanism in another embodiment of the disclosure.
Figure 34:
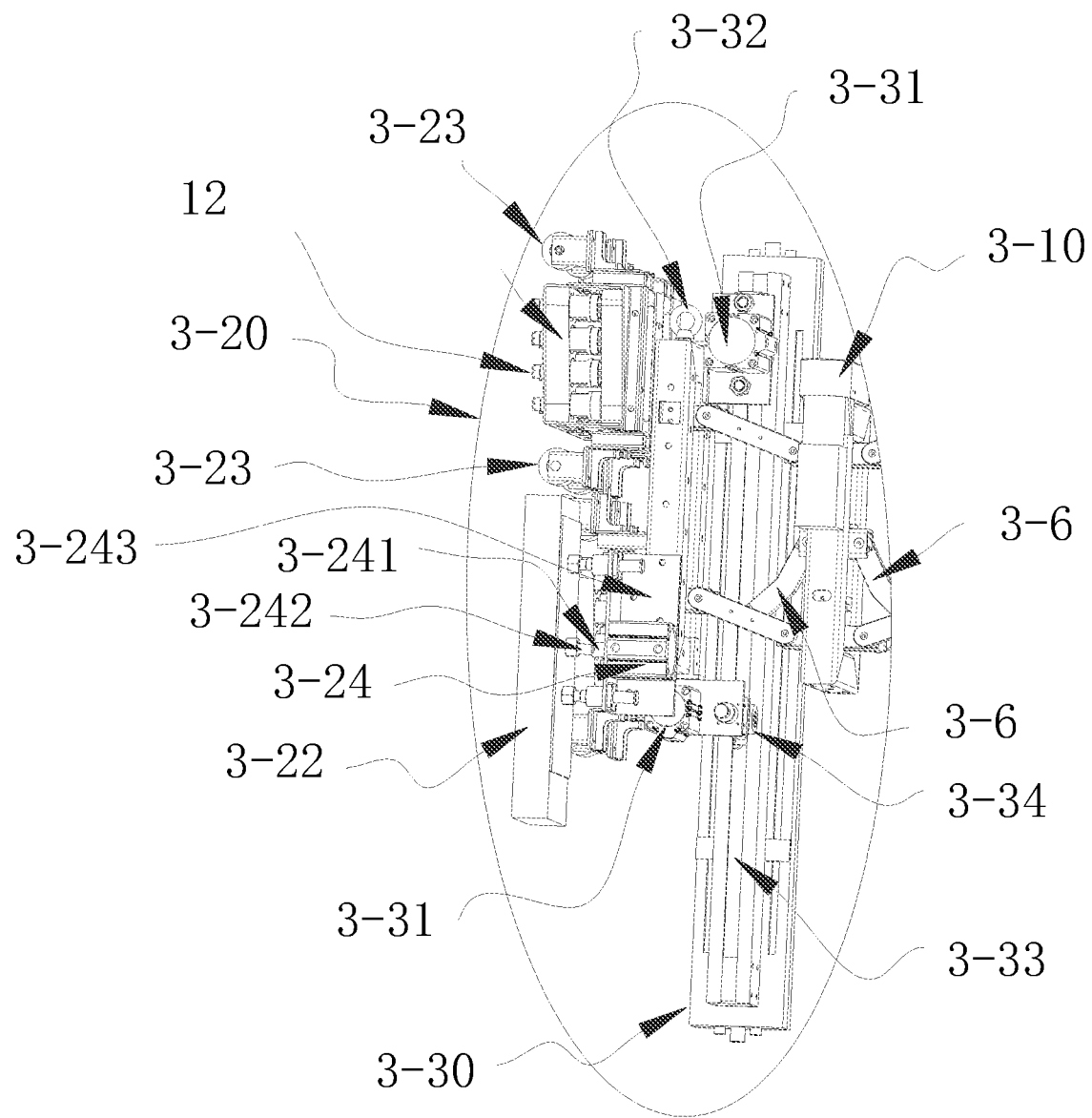
FIG. 34 is a schematic partial enlarged view of FIG. 33.
Figure 35:
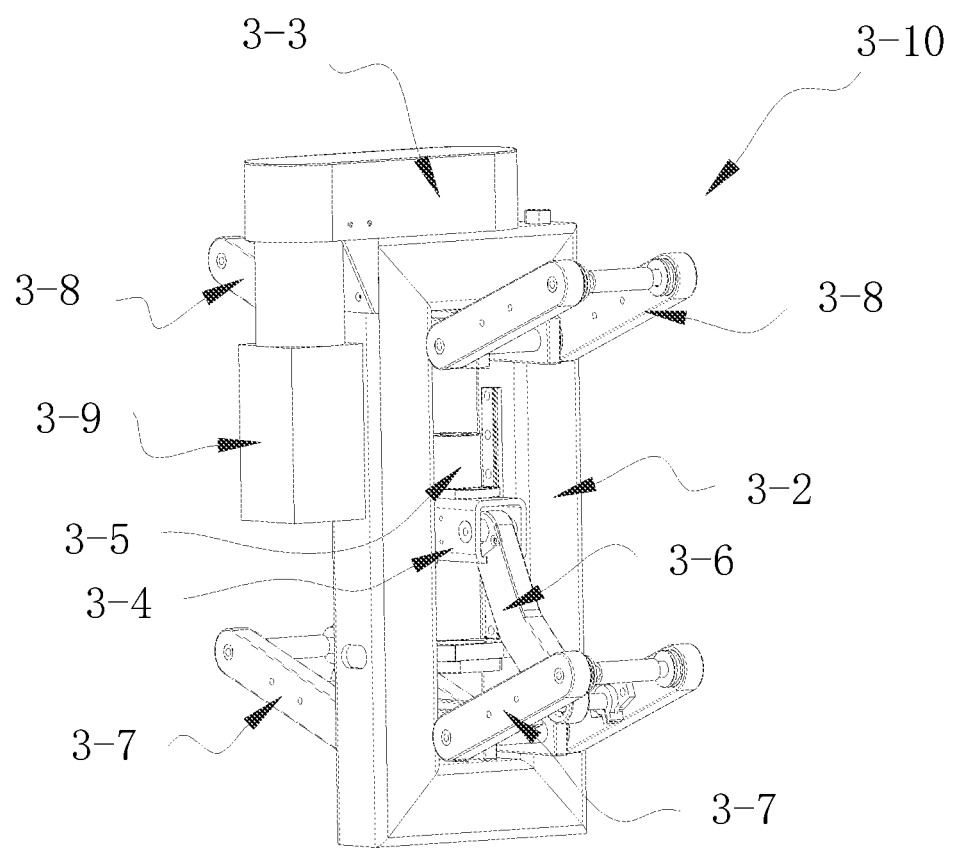
FIG. 35 is a schematic overall structural view of a deformable mechanism of the disclosure.

Referring to FIG. 33 through FIG. 35, in a preferred embodiment, the mounting frame includes a deformable mechanism 3-10, the bullet-carried rust removal mechanism is installed on the deformable mechanism 3-10, and the deformable mechanism 3-10 can drive the bullet-carried rust removal mechanism to move.

The rust removal device further includes two integrated rust removal mechanisms 3-20 located on the left and right sides of the deformable mechanism 3-10, and the rust removal integrated mechanism 3-20 includes multiple bullet-carried rust removal mechanisms 12. In the embodiment, the two integrated rust removal mechanisms 3-20 as climbing legs are respectively installed on the deformable mechanism 3-10. The deformable mechanism 3-10 can drive the two integrated rust removal mechanisms 3-20 to extend and retract together through its own deformation. The extended two integrated rust removal mechanisms 3-20 can perform rust removal on their self-facing rust surfaces to be removed.

As shown in FIG. 35, the deformable mechanism 3-10 includes a frame 3-2 and a lifting motor 3-9 fixed on the frame 3-2. The frame 3-2 is provided with a first nut 3-5 and a vertically arranged first screw rod (the nut screwed with the screw rod can be rotated by rotating the screw rod, and the first screw rod is not shown in the drawings). The first nut 3-5 is screwed on the first screw rod. An upper end of the frame 3-2 is provided with a pulley device 3-3, an output end of the lifting motor 3-9 is linked with the pulley device 3-3, and an upper end of the first screw rod is also linked with the pulley device 3-3. Therefore, the lifting motor 3-9 can control a rotation of the first screw rod through the pulley device 3-3 to thereby control the lifting of the first nut 3-5. In other embodiments, the motor can also be directly connected with the screw rod, and the pulley device 3-3 is omitted. The upper and lower ends of the frame 3-2 are respectively provided with a pair of driven arms, the upper end of the frame 3-2 is hinged with proximal ends of two second driven arms 3-8 respectively, and distal ends of the two second driven arms 3-8 face left and right. A lower end of the frame 3-2 is hinged with proximal ends of two first driven arms 3-7 respectively, and distal ends of the two first driven arms 3-7 face left and right. A lower end of the first nut 3-5 is fixedly connected with a lifting assembly 3-4. The lifting assembly 3-4 is provided with a master arm 3-6 with a distal end facing right and another master arm 3-6 with a distal end facing left (the master arm 3-6 with a far end to the left is covered in the drawings). The proximal ends of the two master arms 3-6 are hinged on the lifting assembly 3-4, and the distal ends of the two first driven arms 3-7 are hinged on the distal ends of the two master arms 3-6 respectively. The second driven arm 3-8 with the distal end facing right and the first driven arm 3-7 with the distal end facing right are a first group, and their distal ends are fixedly connected with an integrated rust removal mechanism 3-20. The other second driven arm 3-8 and the other first driven arm 3-7 are a second group, and their distal ends are fixedly connected with another integrated rust removal mechanism 3-20. When the first nut 3-5 drives the lifting assembly 3-4 to rise, the lifting assembly 3-4 drives the two master arms 3-6 to rise to thereby pull up the two first driven arms 3-7, so as to close the two integrated rust removal mechanisms 3-20, and the two second driven arms 3-8 will swing up with the two integrated rust removal mechanisms 3-20. Similarly, when the first nut 3-5 drives the lifting assembly 3-4 to descend, the two integrated rust removal mechanisms 3-20 extend, and the two second driven arms 3-8 and the two first driven arms 3-7 swing down respectively.

As shown in FIG. 34, taking the integrated rust removal mechanism 3-20 facing left as an example, the integrated rust removal mechanism 3-20 includes a traction ring 3-32 at an upper end, a bullet-carried rust removal mechanism 3-21 facing left, a roller 3-23 facing left, and further includes a first absorbing chassies 3-22 and a second absorbing chassies 3-30 as an attachment assembly in the embodiment. The first absorbing chassies 3-22 is arranged on a base plate 3-243. The base plate 3-243 is fixedly provided with a telescopic motor 3-24 and a second nut 3-241. The second screw rod 3-242 is screwed on the second nut 3-241, and a left end of the second lead screw 3-242 is fixedly connected with the first absorbing chassies 3-22. The telescopic motor 3-24 can control the first absorbing chassies 3-22 to extend to the left and retract to the right by controlling a relative rotation of the second screw rod 3-242 and the second nut 3-241. A surface of the second absorbing chassies 3-30 is provided with a slide rail 3-33, the bullet-carried rust removal mechanism 3-21 and the base plate 3-243 are fixedly connected with each other, and both are provided with a driving pulley 3-34 and a travel motor 3-31. The travel motor 3-31 drives the driving pulley 3-34 to rotate to thereby make the driving pulley 3-34 move along the slide rail 3-33, so as to drive the first absorbing chassies 3-22 and the bullet-carried rust removal mechanism 3-21 to move together relative to the second absorbing chassies 3-30 (the second absorbing chassies 3-30 not only serves as the attachment assembly, but also serves as a traveling part in the embodiment; the sliding rail 3-33 and the driving pulley 3-34 cooperate to realize a movable connection between the integrated rust removal mechanism 3-20 and the frame 3-2 in a climbing direction). Multiple bullets 12 are arranged on a left surface of the knocking portion 1200 of the bullet-carried rust removal mechanism 12. In the integrated rust removal mechanism 3-20 facing left, a right end of the rust removal part 21 is used to fix the distal end of the second driven arm 3-8, and a right end of the base plate 3-243 is used to fix the distal end of the first driven arm 3-7. The component structures of the integrated rust removal mechanism 3-20 facing right and the integrated rust removal mechanism 3-20 facing left are basically the same.

The rust removal device of the embodiment can be used for rust removal operations in various occasions, such as an inner wall of a warehouse and an inner wall of a square tube. Taking the square tube as an example, the working process is as follows: bind the traction ring 3-32 with a traction wire, lift a rust removal machine into the vertical square, and make the second absorbing chassies 3-30 contact an inner back wall of the square tube. The operator starts the telescopic motor 3-24 to make a left and a right first absorbing chassiess 3-22 extend respectively until the first absorbing chassiess 3-22 protrude beyond the knocking portion 1200 of the bullet 12 to thereby avoid the bullet 12 from being worn due to accidental contact with an inner wall of the square tube. In the specific operation, the operator starts the lifting motor 3-9 of the deformable mechanism 3-10 to lower the lifting assembly 3-4, forcing the master arm 3-6 to drive the integrated rust removal mechanism 3-20 to extend until the two first absorbing chassiess 3-22 are against the inner wall of the square tube. The operator controls the first absorbing chassies 3-22 to suck the inner wall of the square tube and the second absorbing chassiess 3-30 to suck the inner back wall of the square tube (whether to suck or not is controlled by vacuum control valves provided by the first absorbing chassies 3-22 and the second absorbing chassies 3-30 respectively). At this time, a position of the rust removal device is fixed, the two groups of bullets 12 face a left inner wall and a right inner wall of the square tube respectively. The operator controls the left and right groups of bullets 12 to remove the rust on the left and right inner walls of the square tube respectively, and completed the rust removal of the two side walls of a section of the square tube (a joint fixation of the first absorbing chassies 3-22 and the second absorbing chassies 3-30 reduces the noise caused by the lifting vibration of the bullet 12). The next step is to adjust the position of the rust removal device to remove the rust of the next section of the square tube, and the details are as follows. The operator controls the first absorbing chassies 3-22 to stop sucking the inner wall of the square tube, then starts the telescopic motor 3-24 to retract the first absorbing chassies 3-22, and the bullet 12 retracts to a protrusion degree of the bullet less than the roller 3-23. Therefore, the roller 3-23 is pressed against the inner wall of the square tube to avoid wearing the first absorbing chassies 3-22. Because the second absorbing chassies 3-30 still sucks the inner back wall of the square tube, the position of the rust removal machine is still fixed, and then the operator starts two travel motors 3-31 to make the two driving pulleys 3-34 rotate in a forward direction, driving the first absorbing chassies 3-22 and bullet 12 to move together relative to the second absorbing chassies 3-30 along the square tube until the first absorbing chassies 3-22 and bullet 12 reach the next section of the square tube and the second absorbing chassies 3-30 remains in the last section of the square tube. At this time, the operator shuts down the travel motor 3-31 and starts the telescopic motor 3-24 to control the first absorbing chassies 3-22 extend again, so that the two first absorbing chassiess 3-22 suck the left inner wall and the right inner wall of the square tube respectively. Then, the vacuum control valve provided by the second absorbing chassies 3-30 is used to control the second absorbing chassies 3-30 to stop sucking the inner back wall of the square tube. The first absorbing chassies 3-22 and the rust removal part 3-21 are fixed on the next section of square tube, and then start the travel motor 3-31 to rotate the driving pulley 3-34 in an opposite direction, so that the second absorbing chassies 3-30 will move towards the next section of square tube, and finally the whole rust removal machine will reach the next section of square tube. The operator shuts down the travel motor 3-31 and controls the second absorbing chassies 3-30 to suck the inner back wall of the square tube, and then remove rust of the square tube according to the rust removal steps of the last section of square tube. Repeat the above steps to complete the rust removal of the left inner wall and the right inner wall of the whole square tube. To remove the rust on the other two inner walls of the square pipe that have not been performed rust removal, just rotate the rust removal machine 90 degrees along a circumferential direction of the square pipe and repeat the above rust removal process. In addition to the function of hoisting the rust removal device, the traction wire also plays a guiding role when the rust removal device moves to the next section of square pipe. If a traveling process is simply considered, the first absorbing chassies 3-22 and the second absorbing chassies 3-30 can also be changed to other attachment assembly such as magnets. When the rust removal bullet is working, the first absorbing chassies 3-22 and the second absorbing chassies 3-30 reduce the vibration intensity transmitted by the bullet 12 to the surface to be derusted, and serve as both shock-absorbing parts and attachment assembly. Considering only the shock-absorbing function without considering the positioning function, both the first absorbing chassies 3-22 and the second absorbing chassies 3-30 of the vacuum suction mechanism can be changed to cushions made of elastic materials.

In order to be applicable to more occasions, a detachable connection is applied between the integrated rust removal mechanism 3-20 and the deformable mechanism 3-10, and the original integrated rust removal mechanism 3-20 is replaced with other specifications of the integrated rust removal mechanism, which can be applied to other different occasions. In addition, it can also be changed as follows: after detachably connecting the deformable mechanism 3-10 and the integrated rust removal mechanism 3-20, it can be detachably installed on other forms of traveling power devices (such as a linear motion mechanism), which is convenient for modular production of the integrated rust removal mechanism 3-20. Similarly, the deformable mechanism 3-10 and the traveling power device can be installed and used in combination with different integrated rust removal mechanisms 3-20. It should also be added that the lifting assembly 3-4 and the master arms 3-6 in the deformable mechanism 3-10 can be changed into an eccentric wheel. When the lifting motor 3-9 drives the eccentric wheel to rotate forward, the eccentric wheel drives the first driven arms 3-7 to swing downward. When the lifting motor 3-9 drives the eccentric wheel to reverse rotation, the eccentric wheel drives the first driven arms 3-7 to swing upward. In the case of changing to other forms of traveling power device (such as a vertical lifting mechanism), the deformable mechanism 3-10 can be changed to a horizontal linear motion mechanism.

The rust removal device of the disclosure integrates the equipment required for rust removal together and reduces the equipment required by the rust removal device, compared with the traditional rust removal device, the volume of the rust removal device associated with the disclosure can be relatively smaller and the occupied area can be reduced.

The technical features of the above embodiments can be combined arbitrarily. For the sake of simple description, not all possible combinations of the various technical features in the above embodiments are described. However, as long as there is no contradiction in the combination of these technical features, it should be regarded as the scope of the specification.

The above-mentioned embodiments only express the concrete implementations of the disclosure, and their descriptions are more specific and detailed, but it should not be understood as limiting the protection scope of the disclosure. It should be noted that for those skilled in the related art, several modifications and improvements can be made without deviating from the inventive concept of the disclosure, which belong to the protection scope of the disclosure. Therefore, the protection scope of the disclosure shall be subject to the appended claims.

What is claimed is:

1. A bullet-carried rust removal mechanism comprising: bullets and a driving mechanism, wherein the bullets are configured for reciprocating linearly under the driving of the driving mechanism to thereby repeatedly knock a surface to be derusted; and an end of each of the bullets away from the driving mechanism is a knocking portion for derusting;

wherein the bullet-carried rust removal mechanism further comprises bullet-carried rust removal mechanism bases; wherein each of the bullet-carried rust removal mechanism bases is provided with a gas receiving cavity, and the driving mechanism is communicated with the gas receiving cavity; and wherein the driving mechanism is provided with a gas distribution mechanism, each of the bullets is movably embedded in the gas receiving cavity, a side wall of each of the bullets abuts against an inner wall of the gas receiving cavity to isolate gas pressure in the gas receiving cavity from atmosphere, the gas distribution mechanism is configured to introduce a gas into the gas receiving cavity to thereby drive each of the bullets to knock the surface to be derusted, and each of the bullets returned back after knocking the surface to be derusted.

2. The bullet-carried rust removal mechanism according to claim 1, further comprising a buffer cavity;

wherein the gas receiving cavity comprises a guide hole and a piston cavity, and the guide hole and the piston cavity are connected and communicated with each other;

wherein each of the bullets is movably embedded in the guide hole, and the side wall of the bullet abuts against an inner wall of the guide hole so that the piston cavity is not communicated with atmospheric pressure;

wherein the piston cavity is provided with a pressurization stage, the guide hole is provided with a pressure relief stage, and a gas passage is provided between the buffer cavity and the pressurization stage so that the buffer cavity and the pressurization stage are communicated with each other;

wherein each of the bullets comprises an inner cavity, a side portion of each of the bullets is provided with a gas ventilation hole communicating with the inner cavity, and a gas outlet of the gas distribution mechanism is communicated with the buffer cavity;

wherein a position of the gas ventilation hole is aligned with the pressurization stage when each of the bullets is in a normal state or retreats to an initial position; gas enters and fills the inner cavity through the gas ventilation hole and each of the bullets is driven by gas pressure in the piston cavity to move forward along the guide hole, when the gas distribution mechanism pressurizes the buffer cavity; and wherein gas pressure in the inner cavity leaks to the pressure relief stage and each of the bullets returns back to the initial position after knocking the surface to be derusted, when each of the bullets moves until the gas ventilation hole is aligned with the pressure relief stage.

3. The bullet-carried rust removal mechanism according to claim 1, wherein each of the bullets comprises an inner cavity, the side wall of each of the bullets is provided with a first gas ventilation hole and a second gas ventilation hole, a side wall of the gas receiving cavity is provided with a pressurization stage and a pressure relief stage, the first gas ventilation hole is operatively aligned with the pressure relief stage, and the second gas ventilation hole is operatively aligned with the pressurization stage.

4. The bullet-carried rust removal mechanism according to claim 3, further comprising a buffer cavity, and a gas outlet of the gas distribution mechanism is communicated with the buffer cavity;

wherein the second gas ventilation hole is aligned with the pressurization stage when the gas distribution mechanism pressurizes the buffer cavity, and thereby gas enters and fills the inner cavity through the second gas ventilation hole and each of the bullets is driven by gas pressure in the piston cavity to move forward along the guide hole; the gas pressure in the inner cavity leaks to the pressure relief stage when each of the bullets moves until the first gas ventilation hole is aligned with the pressure relief stage, and thereby each of the bullets retracts along a direction facing away from the pressure relief stage.

5. The bullet-carried rust removal mechanism according to claim 1, wherein each of the bullet-carried rust removal mechanism bases comprises a first body and a second body, the first body is connected with the second body, a pressurization stage is formed on the first body, a pressure relief stage is formed on the second body, a gas receiving cavity is formed between the first body and the second body, and a bullet outlet allowing the knocking portion of each of the bullets to pass through is formed on the second body; and wherein the gas receiving cavity and the pressure relief stage are communicated while the gas receiving cavity and the pressurization stage are not communicated when each of the bullets is in an extended state, and the gas receiving cavity and the pressure relief stage are not communicated while the gas receiving cavity and the pressurization stage are communicated when each of the bullets is in a retracted state.

6. The bullet-carried rust removal mechanism according to claim 5, wherein the first body comprises a piston cylinder, an inner cover and an outer cover;

wherein the piston cavity is located in the piston cylinder, the bullet passes through the piston cavity, an end of each of the bullets is snapped in the piston cavity, and the outer cover is fixed on the piston cylinder;

wherein the inner cover is located between the piston cavity and the buffer cavity, each of the bullets and the inner cover seal the piston cavity, and the inner cover and the outer cover seal the buffer cavity; and wherein the inner cover is pressed toward the piston cavity by gas pressure when each of the bullets is extended, and each of the bullets presses the inner cover toward the buffer cavity when each of the bullets is restored.

7. The bullet-carried rust removal mechanism according to claim 6, wherein a diameter of the buffer cavity is larger than a diameter of the piston cavity, and the buffer cavity and the piston cavity are coaxial; and wherein a first end of the inner cover is matched with the piston cavity, a second end of the inner cover is matched with the buffer cavity, a second end face of the inner cover is provided with a gas tighten groove, and the gas tighten groove is communicated with the buffer cavity.

8. The bullet-carried rust removal mechanism according to claim 1, wherein each of the bullet-carried rust removal mechanism bases comprises a first body and a second body, the first body and the second body are connected with each other, and a piston cavity and a buffer cavity are formed inside the first body;

wherein the second body is provided with a guide hole, a pressure relief stage is formed on a side wall of the guide hole, and the knocking portion of each of the bullets is capable of passing through the guide hole and protruding outside the guide hole;

wherein the first body further is provided with a gas passage, and a pressurization stage is formed on a side wall of the piston cavity, the pressurization stage is communicated with the buffer cavity through the gas passage; and wherein each of the bullets is provided with an inner cavity and at least one gas ventilation hole, the at least one gas ventilation hole is operatively to be communicated with the pressure relief stage to thereby make pressure in the gas receiving cavity be leakage.

9. The bullet-carried rust removal mechanism according to claim 8, wherein the at least one gas ventilation hole comprises a first gas ventilation hole and a second gas ventilation hole, and the first gas ventilation hole and the second gas ventilation hole are both communicated with the inner cavity; and wherein the second gas ventilation hole is communicated with the pressurization stage while the first gas ventilation hole is closed by a side wall of the guide hole when each of the bullets is in a retracted state, and the first gas ventilation hole is communicated with the pressure relief stage while the second gas ventilation hole is closed by a side wall of the piston cavity when each of the bullets is in an extended state.

10. A rust removal device comprising: a mounting frame and a plurality of bullet-carried rust removal mechanisms installed on the mounting frame, any one of the plurality of bullet-carried rust removal mechanisms being the bullet-carried rust removal mechanism according to claim 1.

11. The rust removal device according to claim 10, comprising a first rust removal array and a second rust removal array, and a feeding channel being provided between the first rust removal array and the second rust removal array;

wherein each of the first rust removal array and the second rust removal array comprises a plurality of the bullet-carried rust removal mechanisms arranged side by side, an orientation of the bullets of the first rust removal array and an orientation of the bullets of the second rust removal array are opposite, and the first rust removal array and the second rust removal array are arranged in face-to-face manner.

12. The rust removal device according to claim 10, wherein at least some of the plurality of bullet-carried rust removal mechanisms are distributed in multiple rows and multiple columns, and centers of the knocking portions of at least some of the bullet-carried rust removal mechanisms in different rows are staggered in a direction perpendicular to a feeding direction of the rust removal device.

13. The rust removal device according to claim 10, wherein the mounting frame comprises a rail robot, the bullet-carried rust removal mechanisms are installed on the rail robot, and the rail robot is configured to drive the bullet-carried rust removal mechanisms to move.

14. The rust removal device according to claim 13, wherein the rail robot comprises a first driving mechanism and a rail assembly for the bullet-carried rust removal mechanism to move, and the rail robot operatively moves under a driving of the first driving mechanism.

15. The rust removal device according to claim 10, wherein the mounting frame comprises a lifting mechanism, the bullet-carried rust removal mechanisms are connected onto the lifting mechanism, the lifting mechanism is provided with an elastic component, an end of the elastic component is fixed on the lifting mechanism, another end of the elastic component is connected with the bullet-carried rust removal mechanisms; and a counteracting force of a surface to be derusted against the bullet-carried rust removal mechanisms causes the elastic component to contract when the lifting mechanism drives the bullet-carried rust removal mechanism to move onto the surface to be derusted.

16. The rust removal device according to claim 10, wherein the mounting frame comprises a deformable mechanism, the bullet-carried rust removal mechanisms are installed on the deformable mechanism, and the deformable mechanism is configured to drive the bullet-carried rust removal mechanisms to move.

17. The rust removal device according to claim 16, wherein the deformable mechanism comprises a base body, a deformation power device, master arms and first driven arms, the deformation power device is fixed on the base body, the deformation power device is hinged with first ends of the master arms, and second ends of the master arms are hinged with the first driven arms respectively, and the deformation power device is capable of driving the first driven arms close to or away from the base body.

18. The rust removal device according to claim 16, further comprising a first absorbing chassis and a second absorbing chassis;

wherein each the first absorbing chassis comprises a first absorption device and a first telescopic device, and the first telescopic device is configured to drive the first absorption device to move; and wherein each the second absorption chassis comprises a second absorption device and a second telescopic device, and the second telescopic device is configured to drive the second absorption device to move; and wherein the first absorption device and the second absorption device extend simultaneously in a first state, while the first absorption device and the second absorption device extend alternately in a second state.

\* \* \* \* \*